United States Patent
Ishihara et al.

(10) Patent No.: US 7,766,719 B2
(45) Date of Patent: Aug. 3, 2010

(54) TRAVELING APPARATUS AND TRAVELING STOPPING METHOD

(75) Inventors: Atsushi Ishihara, Tokyo (JP); Wataru Kokubo, Tokyo (JP)

(73) Assignee: Sony Corporation (JP)

( * ) Notice: Subject to any disclaimer, the term of this patent is extended or adjusted under 35 U.S.C. 154(b) by 762 days.

(21) Appl. No.: 11/494,233

(22) Filed: Jul. 27, 2006

(65) Prior Publication Data

US 2007/0042673 A1 Feb. 22, 2007

(30) Foreign Application Priority Data

Aug. 16, 2005 (JP) ............................ P2005-236027

(51) Int. Cl.
*A63H 17/34* (2006.01)
(52) U.S. Cl. ...................... 446/409; 446/456; 180/6.48; 180/215
(58) Field of Classification Search ................. 180/218, 180/6.5, 6.2, 6.48, 21, 6.28; 280/205, 210, 280/211, 206, 207, 208
See application file for complete search history.

(56) References Cited

U.S. PATENT DOCUMENTS 4,897,070 A * 1/1990 Wagstaff .................... 446/273
6,752,231 B2 * 6/2004 Hume ........................ 180/218
6,902,464 B1 * 6/2005 Lee ............................ 446/456

FOREIGN PATENT DOCUMENTS

JP 2005-001554 A 1/2005

* cited by examiner

*Primary Examiner*—Lesley Morris
*Assistant Examiner*—Jacob Knutson
(74) *Attorney, Agent, or Firm*—Lerner, David, Littenberg, Krumholz & Mentlik, LLP

(57) ABSTRACT

A traveling apparatus, including a housing, first and second wheels, a wheel driving section, and a control section. The first and second wheels are supported for individual rotation in one and the other direction around a common axis on the housing. The wheel driving section is configured to drive the first and second wheels to rotate individually. The control section is configured to control the wheel driving section and is operable to control, when traveling of the housing which is traveling is to be stopped, the wheel driving section to drive the first and second wheels to rotate in different conditions from each other so that the housing is revolved toward a first one of the leftward and rightward directions with respect to a traveling direction of the housing once and then revolved toward a second one of the leftward and rightward directions to stop the housing.

14 Claims, 15 Drawing Sheets

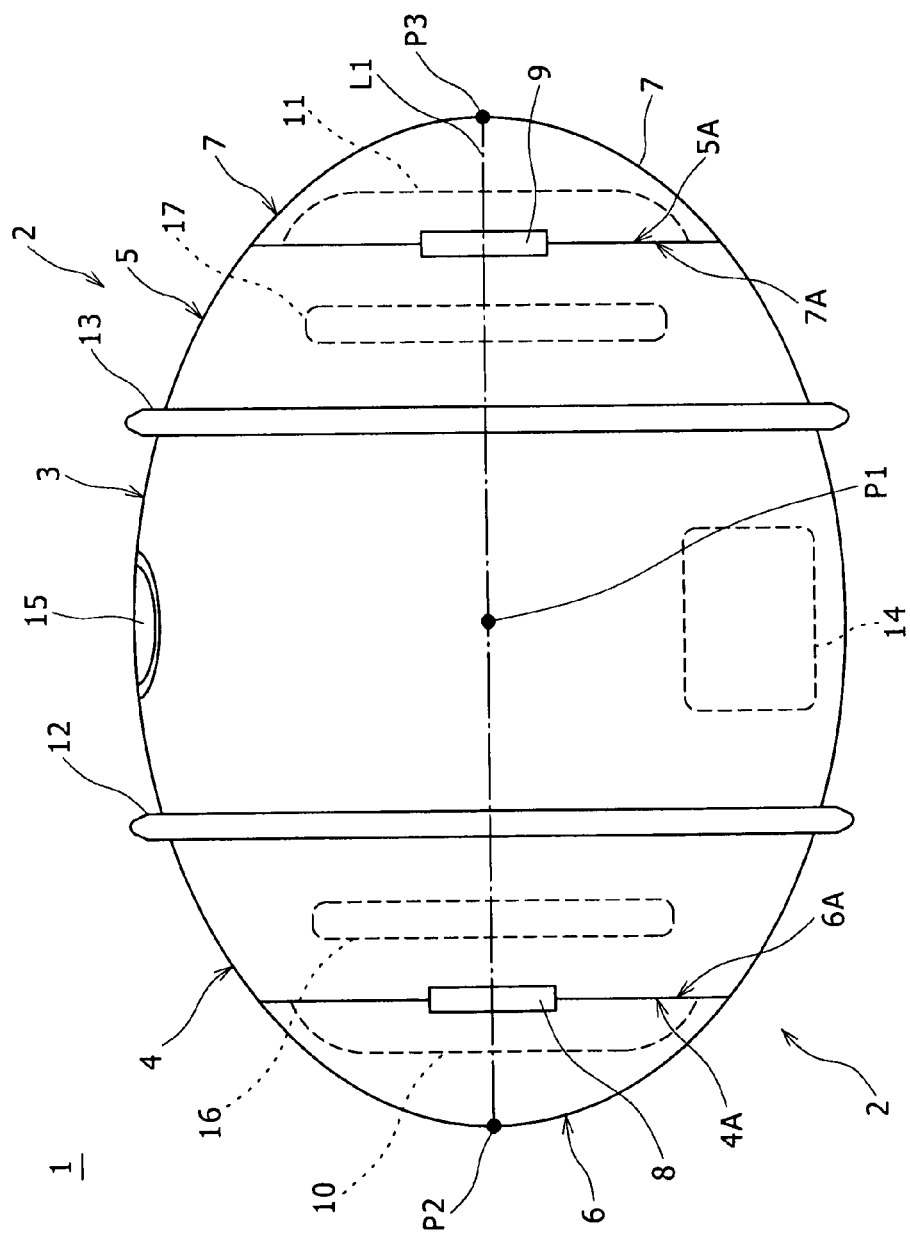

TRAVELING APPARATUS AND TRAVELING STOPPING METHOD

CROSS REFERENCES TO RELATED APPLICATIONS

The present application claims priority from Japanese Patent Application No. JP 2005-236027, filed in the Japanese Patent Office on Aug. 16, 2005, the entire content of which is incorporated herein by reference.

BACKGROUND OF THE INVENTION

1. Field of the Invention

This invention relates to a traveling apparatus and a traveling stopping method, and more particularly to a two-wheel traveling apparatus and a traveling stopping method suitably applicable to a music reproduction robot apparatus which includes first and second wheels supported for rotation in the opposite directions around the same axis of rotation and can travel with the first and second wheels driven to rotate.

2. Description of the Related Art

A coaxial two-wheeled vehicle in the past is configured such that a base is supported for tilting motion on a wheel shaft extending between a pair of wheels. Further, if the load to the base is positioned within a stopping region corresponding to a ground contact region of the wheels with the road, then signaling of a traveling instruction to a pair of driving motors for driving the wheels is stopped. Further, if the load on the base is positioned outside the stopping region, then the coaxial two-wheeled vehicle sends a traveling instruction in accordance with the position to the driving motors. In this manner, the coaxial two-wheeled vehicle travels stably even if the position of the center of gravity of the load moves on the base. Such a coaxial two-wheeled vehicle is disclosed, for example, in Japanese Patent Laid-Open No. 2005-1554 (particularly pages 1 and 4) (hereinafter referred to as Patent document 1).

SUMMARY OF THE INVENTION

However, in such a coaxial two-wheeled vehicle as disclosed in Patent Document 1, if rotational driving of the wheels in pair is merely stopped in a state in which the wheels are driven to rotate so that the coaxial two-wheeled vehicle travels in a direction in which it can advance straightforwardly (hereinafter referred to as straightforward direction) like a forward direction, then a force to cause the wheels to rotate in the straightforward direction side acts from an inertial force which is generated on the coaxial two-wheeled vehicle and acts to advance the coaxial two-wheeled vehicle in the straightforward direction. Therefore, if rotational driving of the wheels is stopped in order to stop traveling in a state wherein the coaxial two-wheeled vehicle is traveling in a straightforward direction, then the wheels sometimes roll in the straightforward direction side by such an inertial force. Thus, the coaxial two-wheeled vehicle in the past has a problem that traveling in its straightforward direction cannot be stopped readily.

Therefore, it is desirable to provide a traveling apparatus and a traveling stopping method by which traveling in a straightforward direction can be stopped readily.

According to an embodiment of the present invention, there is provided a traveling apparatus including a housing, first and second wheels supported for individual rotation in one and the other direction around a common axis on the housing, a wheel driving section configured to drive the first and second wheels to rotate individually, and a control section configured to control the wheel driving section, the control section being operable to control, when traveling of the housing which is traveling is to be stopped, the wheel driving section to drive the first and second wheels to rotate in different conditions from each other so that the housing is revolved toward a first one of the leftward and rightward directions with respect to a traveling direction of the housing once and then revolved toward a second one of the leftward and rightward directions to stop the housing.

In the traveling apparatus, when the housing which is traveling in a straightforwardly traveling direction is to be stopped, an inertial force generated on the housing by the straightforward traveling and acting upon the housing to travel in the straightforwardly traveling direction is converted, by revolution of the housing toward a first direction, into an inertial force acting to revolve the housing toward the first direction. Then, the inertial force toward the first direction is almost canceled with another inertial force which is generated on the housing by subsequent revolution of the housing toward a second direction opposite to the first direction and acts to revolve the housing toward the second direction. In this state, driving rotation of the first and second wheels can be stopped. In other words, in the traveling apparatus, when the housing which travels in the straightforwardly traveling direction is to be stopped, the housing can be revolved toward the first direction once and then revolved toward the other direction to almost cancel the inertial force in the straightforwardly traveling direction generated by the traveling of the housing in the straightforwardly traveling direction. Therefore, in the traveling apparatus, even if the driving rotation of the first and second wheels is stopped, such a situation that the housing is caused to roll to the straightforwardly traveling direction side by the inertial force in the straightforwardly traveling direction can be prevented almost with certainty.

Consequently, with the traveling apparatus, the inertial force in the straightforwardly traveling direction generated on the housing by the traveling in the straightforwardly traveling direction can be almost canceled, and in this state, the driving rotation of the first and second wheels is stopped. As a result, such a situation that the housing is caused to roll to the straightforwardly traveling direction side by the inertial force in the straightforwardly traveling direction can be prevented almost with certainty. Consequently, traveling of the traveling apparatus and the traveling stopping method in the straightforwardly traveling direction can be stopped readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a schematic rear elevational view showing a configuration of the music reproduction robot apparatus;

DETAILED DESCRIPTION OF THE PREFERRED EMBODIMENTS

Figure 1A:
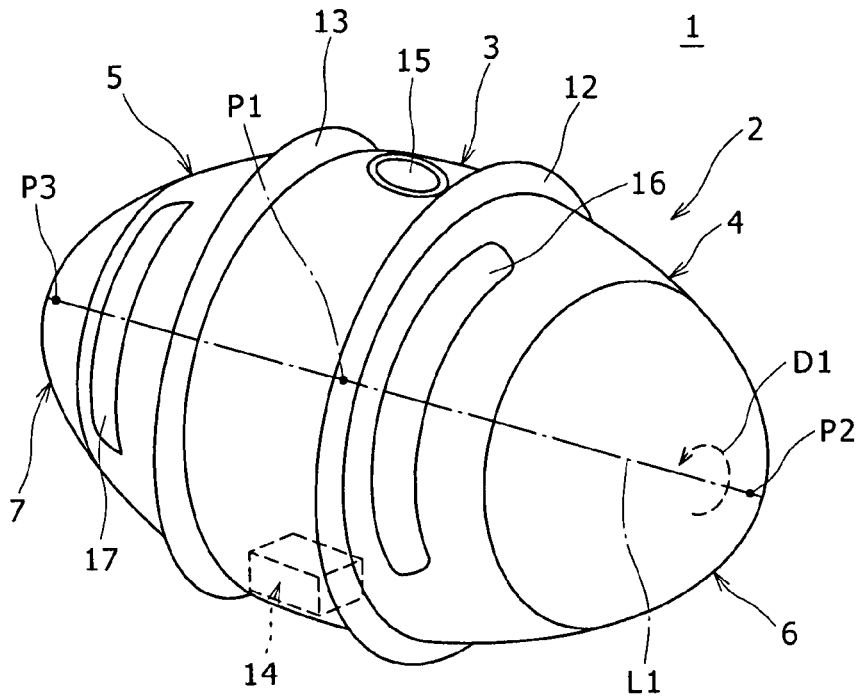
FIGS. 1A and 1B are schematic perspective views of an appearance of a music reproduction robot apparatus to which an embodiment of the present invention is applied.

Referring to the drawings, an embodiment of the present invention is described in detail hereinafter.

Figure 1B:
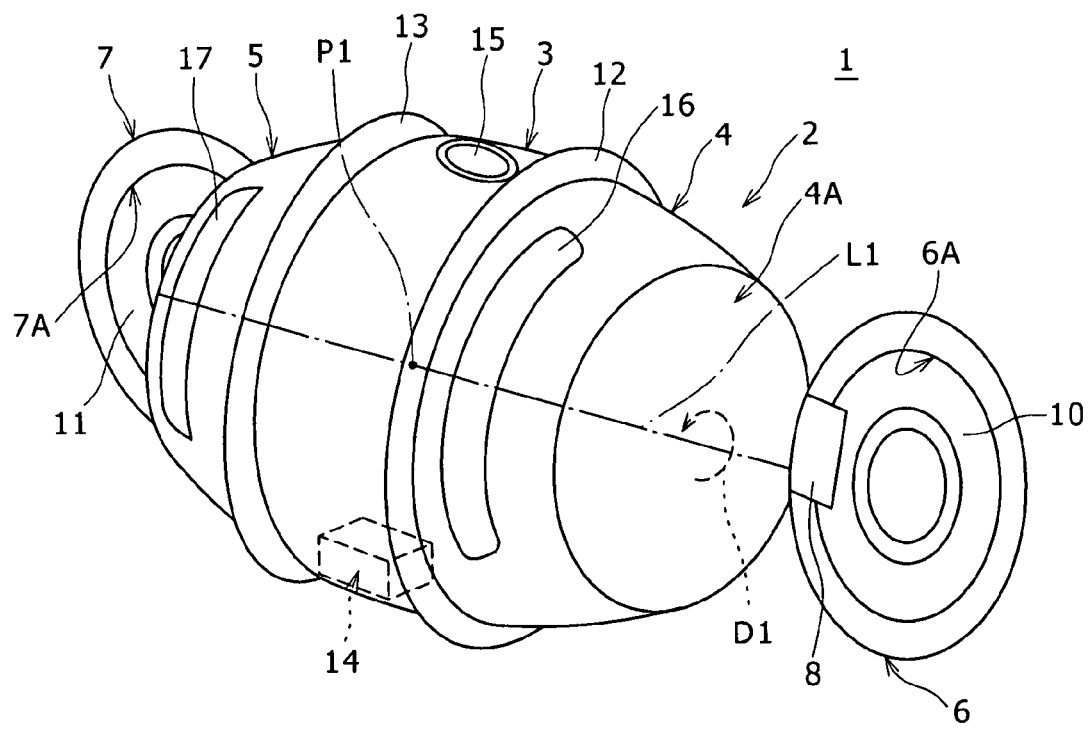

Referring first to FIGS. 1A and 1B, there is shown a music reproduction robot apparatus to which the present invention is applied. The music reproduction robot apparatus is generally denoted by 1 and includes an apparatus housing 2 of a substantially ellipsoidal shape. The apparatus housing 2 is hereinafter referred to as an ellipsoidal housing member 2. The ellipsoidal housing member 2 includes a housing central member 3 provided at a central portion thereof and having a substantially barrel shape. The ellipsoidal housing member 2 further includes a first housing rotatable member (hereinafter referred to as housing right side rotatable member) 4 having a substantially circular truncated conical shape and positioned at one of a pair of mutually opposing end portions of the housing central member 3 (the one end portion is hereinafter referred to as right side end portion). The ellipsoidal housing member 2 further includes a second housing rotatable member (hereinafter referred to as housing left side rotatable member) 5 having a substantially circular truncated conical shape and positioned at the other end portion (hereinafter referred to as left side end portion) of the housing central member 3. The ellipsoidal housing member 2 further includes a first housing opening/closing member (hereinafter referred to as housing right side opening/closing member) 6 having a substantially conical shape with a circuit recessed portion provided thereon and positioned adjacent a right end face 4A of the housing right side rotatable member 4. The ellipsoidal housing member 2 further includes a second housing opening/closing member (hereinafter referred to as housing left side opening/closing member) 7 having a substantially conical shape with a second recessed portion provided thereon and positioned adjacent a left end face 5A of the housing left side rotatable member 5.

Where a horizontal rotation axis L1 is defined as a line segment (that is, a major axis of the ellipsoidal shape) interconnecting the right and left side vertices P2 and P3 of the surface of the ellipsoidal housing member 2 farthest from the central point P1 of the ellipsoidal housing member 2, the housing right side rotatable member 4 is supported for rotation in a first rotational direction D1 and a second rotational direction opposite to the first rotational direction D1 around the horizontal rotation axis L1 at the right side end portion of the housing central member 3. Meanwhile, the housing left side rotatable member 5 is supported for rotation in the first rotational direction D1 and the second rotational direction around the horizontal rotation axis L1 at the left side end portion of the housing central member 3.

Figure 3:
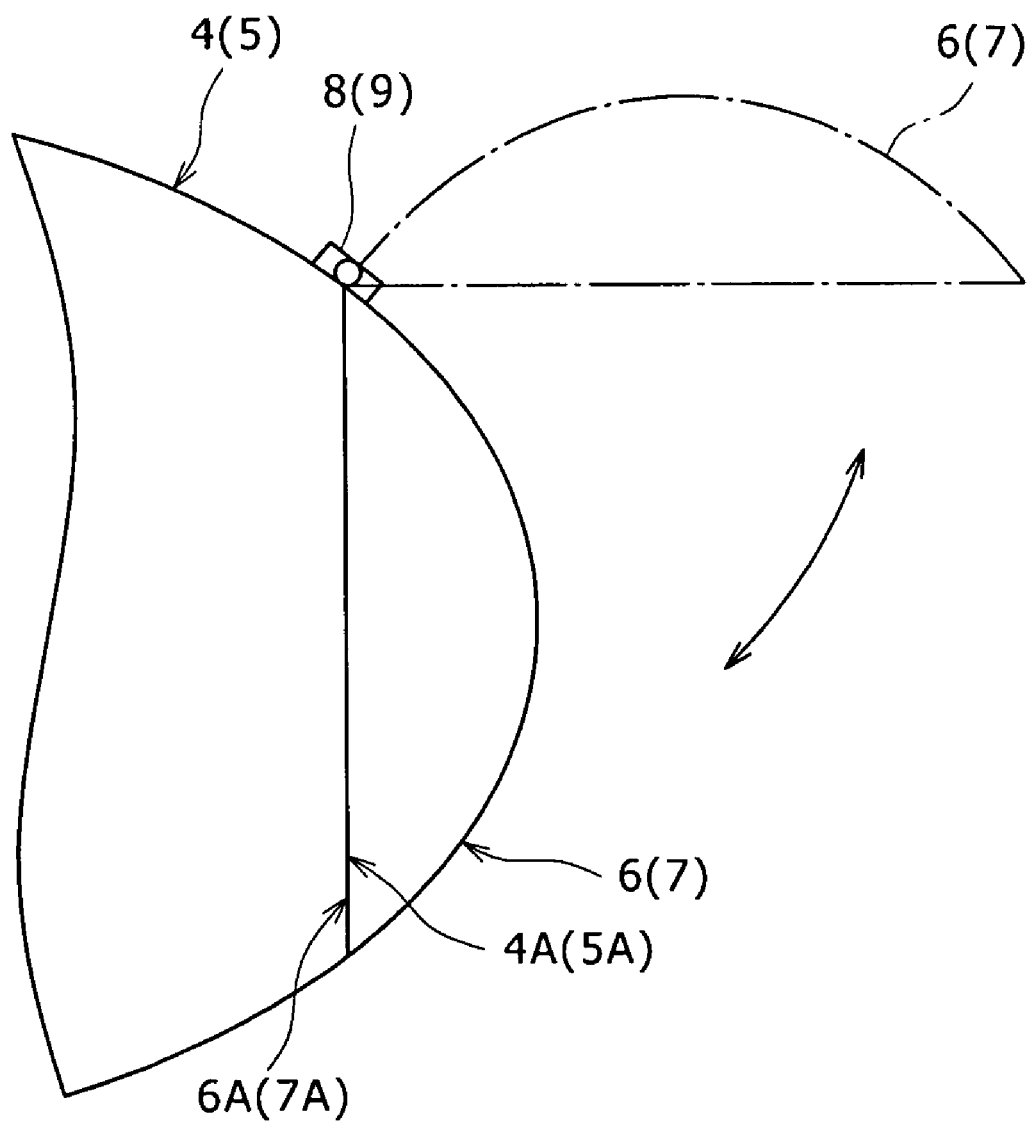
FIG. 3 is a schematic view illustrating opening and closing movement of a housing right side opening/closing member and a housing left side opening/closing member of the music reproduction robot apparatus with respect to a housing right side rotatable member and a housing left side rotatable member.

Referring to FIG. 3, the housing right side opening/closing member 6 is attached for opening and closing pivotal motion with respect to the housing right side rotatable member 4 within a range of a predetermined angle by a hinge member 8 provided at a predetermined position at an end portion of the right end face 4A of the housing right side rotatable member 4. Incidentally, the housing right side opening/closing member 6 is opened to an arbitrary angle with respect to the housing right side rotatable member 4 from a position at which the right end face 4A and an entire opening 6A of the first recessed portion contact with each other to another position at which, for example, the opening angle between the right end face 4A and the opening 6A is substantially 90 degrees. On the other hand, the housing left side opening/closing member 7 (FIG. 3) is attached for opening and closing movement to the housing left side rotatable member 5 over a predetermined angular range by a hinge member 9 provided at a predetermined position at an edge portion of the left end face 5A of the housing left side rotatable member 5. Incidentally, the housing left side opening/closing member 7 is opened to an arbitrary angle with respect to the housing left side rotatable member 5 from a position at which the left end face 5A and an entire opening 7A of the second recessed portion to another position at which, for example, the opening angle between the left end face 5A and the opening 7A is substantially 90 degrees.

In the first recessed portion (FIGS. 1B and 2) of the housing right side opening/closing member 6, a first speaker (hereinafter referred to as right speaker) 10 for the right channel from between a pair of first and second speakers 10 and 11 for stereo reproduction is accommodated such that only the front face of a circular diaphragm thereof is exposed through the opening 6A of the first recessed portion. The housing right side opening/closing member 6 can be opened and closed independently of the housing left side opening/closing member 7, and when it is pivoted around the hinge member 8 to close the right end face 4A of the housing right side rotatable member 4 with the entire opening 6A thereof contacted with the right end face 4A, it can cover the diaphragm of the right speaker 10 from the outside. On the other hand, when it is pivoted around the hinge member 8 to open the right end face 4A of the housing right side rotatable member 4 with the opening 6A spaced away from the right end face 4A, it can direct the front face of the diaphragm of the right speaker 10 to an arbitrary outer direction.

Meanwhile, in the second recessed portion of the housing left side opening/closing member 7, the second speaker (hereinafter referred to as left speaker) 11 for the left channel having a similar configuration and a similar shape to those of the right speaker 10 is accommodated such that only the front face of a circular diaphragm thereof is exposed through the opening 7A of the second recessed portion. When the housing left side opening/closing member 7 is pivoted around the hinge member 9 to close the left end face 5A of the housing left side rotatable member 5 with the entire opening 7A thereof contacted with the left end face 5A, it can cover the diaphragm of the left speaker 11 from the outside. On the other hand, when the housing left side opening/closing member 7 is pivoted around the hinge member 9 to open the left end face 5A of the housing left side rotatable member 5 with the opening 7A spaced away from the left end face 5A, it can direct the front face of the diaphragm of the left speaker 11 to an arbitrary outer direction.

Figure 4:
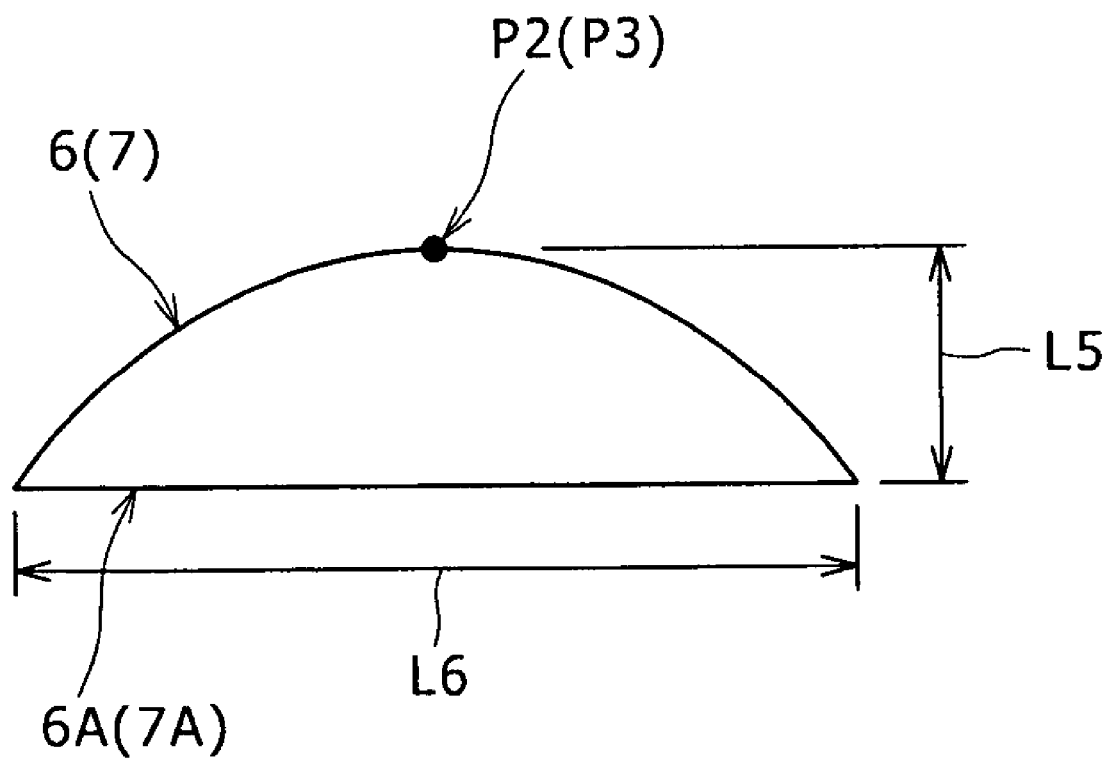
FIG. 4 is a schematic view showing a shape of the housing right side opening/closing member and the housing left side opening/closing member of the music reproduction robot apparatus.

Incidentally, the diaphragm of the right speaker 10 and the left speaker 11 is formed such that the diameter thereof is greater than the general thickness thereof from the front face toward the rear face. Further, as shown in FIG. 4, the housing right side opening/closing member 6 and the housing left side opening/closing member 7 are formed such that the diameter L6 of the first and second openings 6A and 7A is greater than the width L5 to the vertices P2 and P3 with reference to the first and second openings 6A and 7A in accordance with the shape of the right speaker 10 and the left speaker 11. Therefore, when the housing right side opening/closing member 6 and the housing left side opening/closing member 7 are opened, the overall length of the ellipsoidal housing member 2 along the horizontal rotation axis L1 (that is, the length of the ellipsoidal housing member 2 in the lengthwise direction, and this is hereinafter referred to as housing width) is greater than the horizontal rotation axis L1 (that is, the major axis of the ellipsoidal shape). However, when both of the housing right side opening/closing member 6 and the housing left side opening/closing member 7 are closed, the entire housing of the ellipsoidal housing member 2 can be made compact to the utmost (that is, the housing width is make equal to the major axis of the ellipsoidal shape which is the horizontal rotation axis L1 to make the housing compact) thereby to enhance the accommodation performance.

Figure 5:
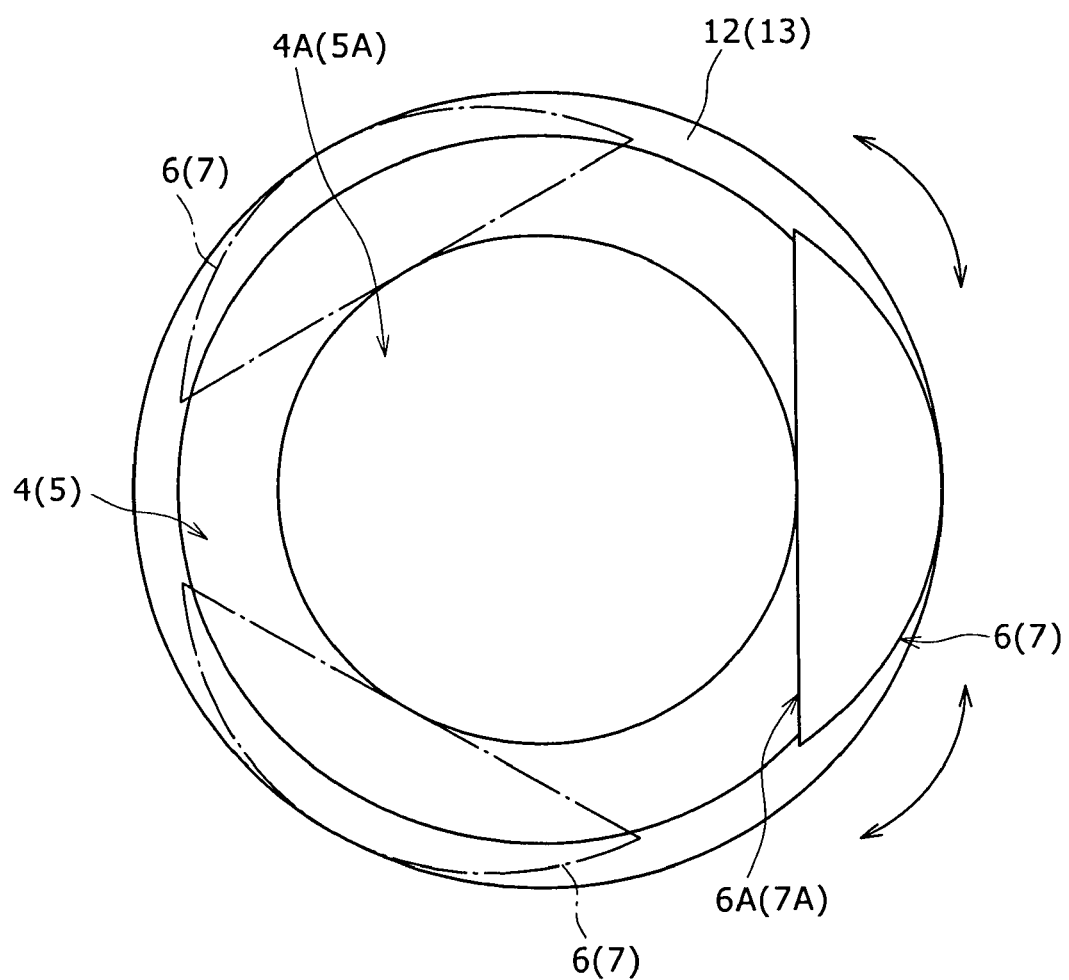
FIG. 5 is a schematic view illustrating rotation of the housing right side rotatable member and the housing left side rotatable member of the music reproduction robot apparatus.
Figure 6:
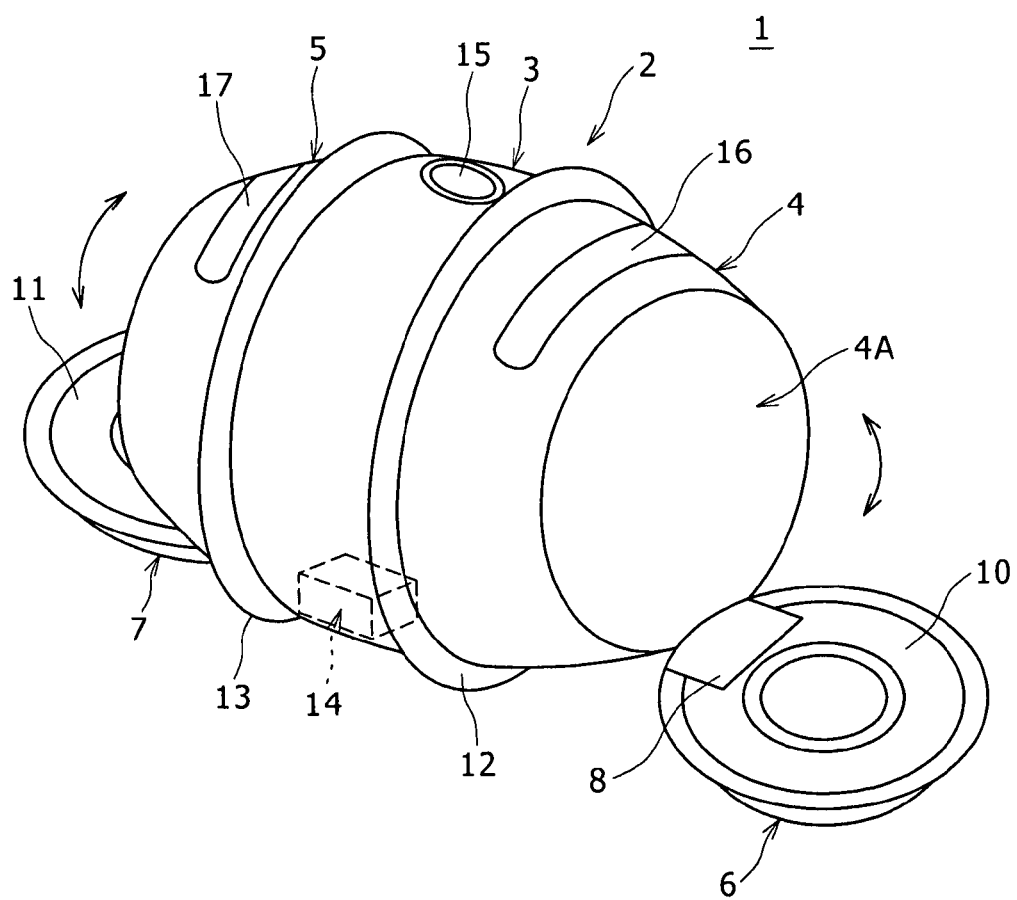
FIG. 6 is a schematic view illustrating variation of the direction of a right speaker and a left speaker upon rotation of the housing right side rotatable member and the housing left side rotatable member of the music reproduction robot apparatus.

Further, as shown in FIGS. 5 and 6, the housing right side rotatable member 4 can be rotated independently of the housing left side rotatable member 5, and where the housing right side opening/closing member 6 is pivoted in a state wherein it is open at an arbitrary angle, the front face of the diaphragm of the right speaker 10 accommodated in the housing right side opening/closing member 6 can be directed to various directions such as the front direction, rear direction, upward direction or downward direction of the housing central member 3. Meanwhile, also where the housing left side rotatable member 5 is pivoted in a state wherein the housing left side opening/closing member 7 is open at an arbitrary point, the front face of the diaphragm of the left speaker 10 accommodated in the housing left side opening/closing member 7 can be directed to various directions such as the front direction, rear direction, upward direction or downward direction of the housing central member 3.

In addition, as seen in FIGS. 1A, 1B and 2, a first wheel (hereinafter referred to as right side wheel) 12 of an annular shape having a predetermined outer diameter greater than a maximum outer diameter of the housing central member 3 is supported at a right side end portion of the housing central member 3 for rotation in the first rotational direction D1 and the opposite second direction around the horizontal rotation axis L1. Meanwhile, a second wheel (hereinafter referred to as left side wheel) 13 having a shape and an outer diameter same as those of the right side wheel 12 is supported for rotation at a left side end portion of the housing central member 3 for rotation in the first rotational direction D1 and the opposite second direction around the horizontal rotation axis L1 similarly to the right side wheel 12. The right side wheel 12 and the left side wheel 13 are made of a resilient material such as rubber and disposed substantially in parallel to each other in a spaced relationship by a predetermined distance from each other. Although the right side wheel 12 and the left side wheel 13 can rotate so that the ellipsoidal housing member 2 itself can run, since they can rotate independently of each other, the ellipsoidal housing member 2 can travel in various states such as straightforward traveling and revolution.

A weight 14 which may be a battery or the like is secured at a predetermined position of an inner wall in the housing central member 3. Further, the housing central member 3 is formed such that the distance from the central point P1 of the ellipsoidal housing member 2 to the right side end portion (that is, to the right side wheel 12) and the distance from the central point P1 of the ellipsoidal housing member 2 to the left side end portion (that is, to the left side wheel 13) are substantially equal to each other. Further, the housing right side rotatable member 4 and the housing left side rotatable member 5 have shapes same as each other and have predetermined widths equal to each other. Furthermore, also the housing right side opening/closing member 6 and the housing left side opening/closing member 7 have same shapes as each other, and the widths L5 from the first and second openings 6A and 7A of the first and second recessed portions of the housing right side opening/closing member 6 and the housing left side opening/closing member 7 to the vertices P2 and P3 of the surface, respectively, are predetermined lengths substantially equal to each other. In other words, the ellipsoidal housing member 2 is formed leftwardly and rightwardly symmetrically with respect to an imaginary plane (not shown) which passes the central point P1 of the ellipsoidal housing member 2 and extends perpendicularly to the horizontal rotation axis L1.

Therefore, where the ellipsoidal housing member 2 is placed on a top plate of a desk, a floor or the like (hereinafter referred to collectively as floor), it is supported by the right side wheel 12 and the left side wheel 13 in such a posture that an outer circumferential face of a maximum diameter portion of the housing central member 3 is spaced a little from the surface of the floor and the horizontal rotation axis L1 extends in parallel to the surface of the floor. In addition, since the center of gravity of the housing central member 3 is displaced to the inner wall side from the central point P1 by the weight 14 in the housing central member 3, where the housing central member 3 is placed on the floor, it has such a posture that the weight 14 is positioned on the lower side in the vertical direction, that is, the center of gravity at the weight 14 portion is positioned closest to the surface of the floor (the posture is hereinafter referred to as reference posture). Thus, the weight 14 in the housing central member 3 has a comparatively great weight. Accordingly, where the ellipsoidal housing member 2 is placed on the floor in a state wherein it is supported by the right side wheel 12 and the left side wheel 13, even if the housing right side opening/closing member 6 and the housing left side opening/closing member 7 are opened to an arbitrary angle independently of each other, the ellipsoidal housing member 2 can maintain the reference posture without being inclined to the right side, left side or the like.

Also when the ellipsoidal housing member 2 itself travels by rotation of the right side wheel 12 and the left side wheel 13 on the floor, since the center of gravity of the housing central member 3 is displaced toward the inner wall from the central point P1 by the weight 14 in the housing central member 3, rotation of the housing central member 3 in the first rotational direction D1 and the opposite second direction around the horizontal rotation axis L1 can be suppressed. Further, since the weight 14 is comparatively heavy, the ellipsoidal housing member 2 can substantially keep the reference posture almost without being inclined to the right side or the left side even if the housing right side opening/closing member 6 and the housing left side opening/closing member 7 are opened to an arbitrary angle independently of each other when the ellipsoidal housing member 2 itself travels.

In addition, a contact detection sensor element 15 for detecting contact of a finger, a hand or the like therewith is provided at a portion of the surface of the housing central member 3 which is positioned on the upper side in the reference posture. The contact detection sensor element 15 detects, for example, a finger, a hand or the like which contacts with a region of a size of a fingertip on the surface of the housing central member 3. A right side light emitting element 16 of an arcuate shape which emits light is provided on the surface of the housing right side rotatable member 4. Further, another left side light emitting element 17 of an arcuate shape which emits light is provided also on the surface of the housing left side rotatable member 5. The right side light emitting element 16 and the left side light emitting element 17 emit light in various light emitting conditions such that they emit light entirely or partly or they emit lights of different colors.

Figure 7:
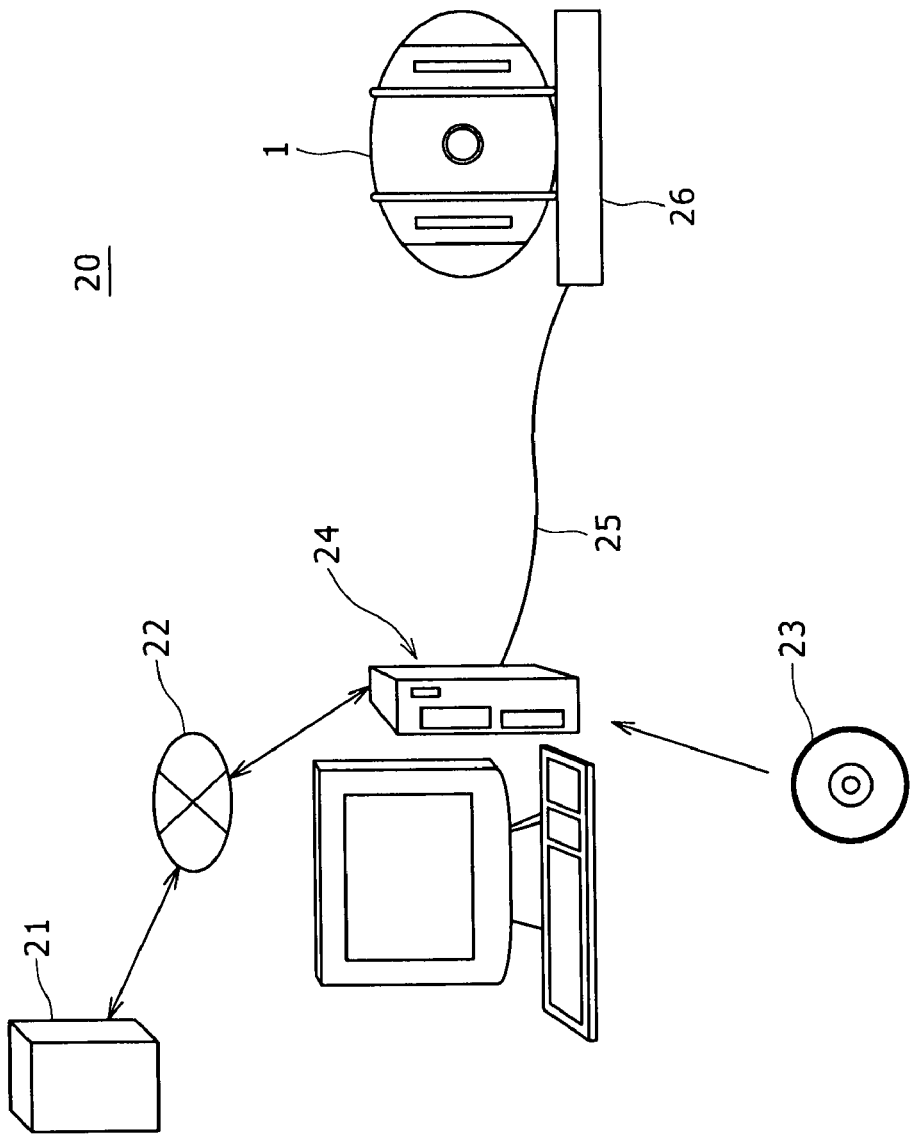
FIG. 7 is a schematic view showing a configuration of a music data transfer system.

Now, a music data transfer system 20 which transfers music data to the music reproduction robot apparatus 1 is described with reference to FIG. 7. The music data transfer system 20 includes a data transfer apparatus 24 having a configuration of, for example, a personal computer which acquires music data from a music data providing server 21, which provides music data, through a network 22 and reproduces and acquires music data from a recording medium 23 such as a CD (Compact Disk) on which the music data are recorded.

Figure 8:
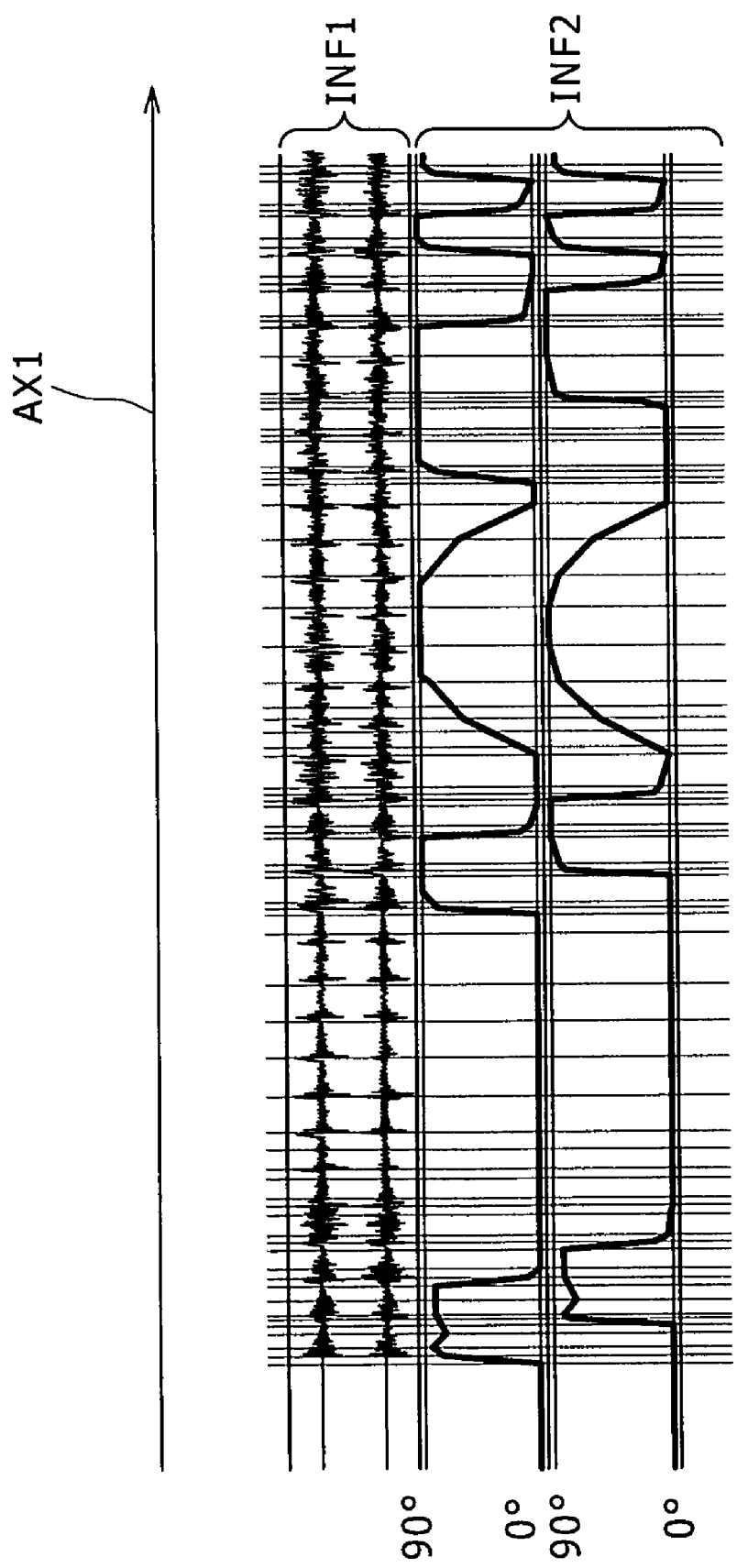
FIG. 8 is a waveform diagram illustrating music analysis result information and driving section control information.

The data transfer apparatus 24 performs, for example, a frequency analysis process for music data to be supplied to the music reproduction robot apparatus 1. Consequently, the data transfer apparatus 24 acquires music analysis result information INF1 representative of a result of the frequency analysis of the music data along a reproduction time axis AX1 as seen in FIG. 8. Further, the data transfer apparatus 24 produces driving section control information INF2 which represents directions and speeds of rotation of the right side wheel 12 and the left side wheel 13 of the music reproduction robot apparatus 1, directions and speeds of rotation of the housing right side rotatable member 4 and the housing left side rotatable member 5, opening/closing angles and so forth of the housing right side opening/closing member 6 and the housing left side opening/closing member 7 along the reproduction time axis AX1. Further, the data transfer apparatus 24 produces, based on the music analysis result information INF1, driving information (not shown) which represents light emitting conditions in which the right side light emitting element 16 and the left side light emitting element 17 of the music reproduction robot apparatus 1 are to be driven to emit light along the reproduction time axis AX1.

In this manner, the data transfer apparatus 24 acquires the driving section control information INF2 for causing the movable elements of the music reproduction robot apparatus 1 (that is, the housing right side rotatable member 4 and housing left side rotatable member 5, housing right side opening/closing member 6 and housing left side opening/closing member 7, and right side wheel 12 and left side wheel 13) and driving the right side light emitting element 16 and the left side light emitting element 17 in response to a tune of music data. Incidentally, the driving section control information INF2 illustrated in FIG. 8 represents the opening/closing angle to which the housing right side opening/closing member 6 and the housing left side opening/closing member 7 are opened or closed along the reproduction time axis AX1 of the music data.

For example, if a transfer operation is performed by the user, then the data transfer apparatus 24 transfers music data of an object of supply and the driving section control information INF2 and driving information corresponding to the music data to the music reproduction robot apparatus 1 successively through a USB (Universal Serial Bus) cable 25 and a cradle 26 on which the music reproduction robot apparatus 1 is to be placed.

Figure 9:
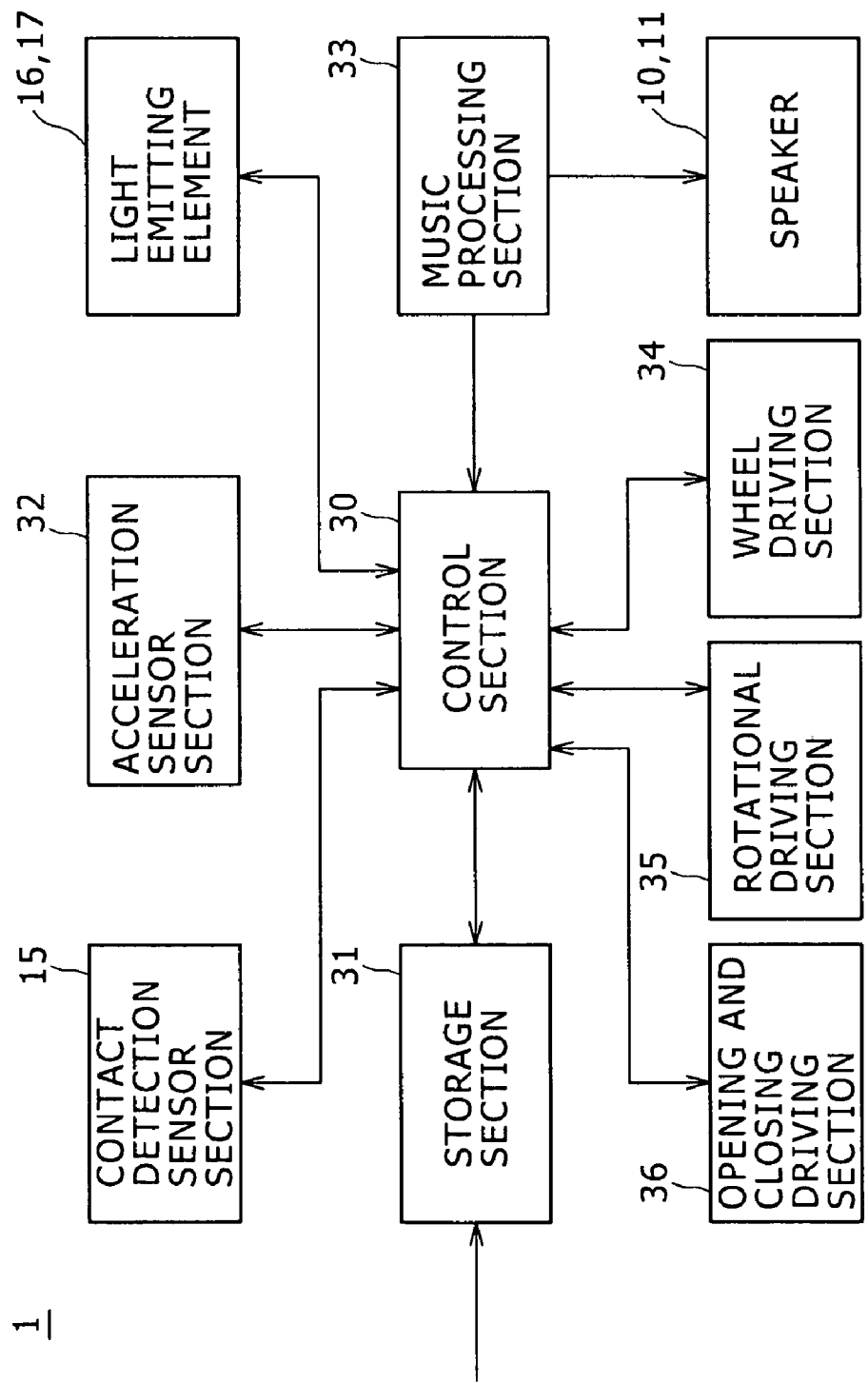
FIG. 9 is a block diagram showing a circuit configuration of the music reproduction robot apparatus.

Now, a circuit configuration of the music reproduction robot apparatus 1 is described with reference to FIG. 9. The component circuits of the music reproduction robot apparatus 1 are accommodated in the ellipsoidal housing member 2, and the music reproduction robot apparatus 1 includes a control section 30 which controls the component circuits of the entire music reproduction robot apparatus 1. The control section 30 executes various processes in accordance with various programs stored in an internal memory in advance. The control section 30 fetches music data supplied from the external data transfer apparatus 24 and the driving section control information INF2 and driving information corresponding to the music data into a storage section 31 through the cradle 26 and stores the music data, driving section control information INF2 and driving information into the storage section 31.

Figure 10:
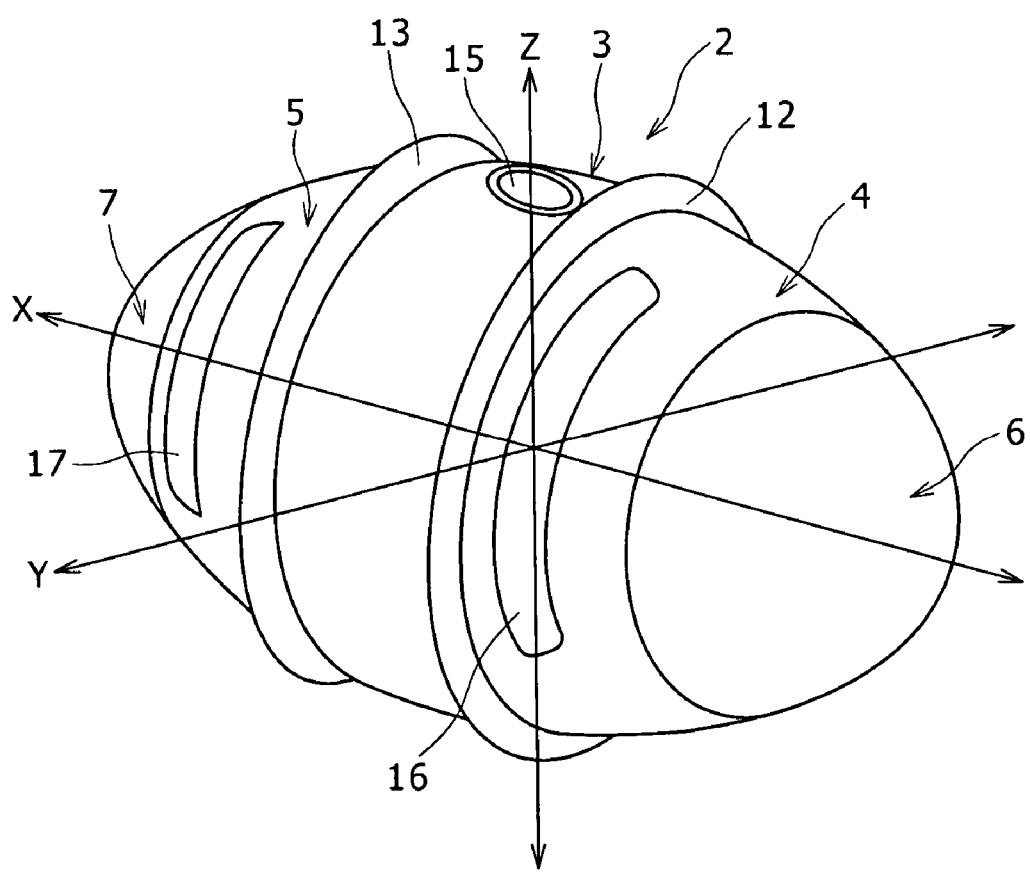
FIG. 10 is a schematic perspective view illustrating detection of an acceleration by an acceleration detection section of the music reproduction robot apparatus.

The music reproduction robot apparatus 1 includes an acceleration sensor section 32. Referring to FIG. 10, the acceleration sensor section 32 detects accelerations, for example, along three axes (X axis, Y axis and Z axis) perpendicular to each other generated in the ellipsoidal housing member 2 and notifies the control section 30 of a result of the detection as an X-axis detection acceleration value, a Y-axis detection acceleration value and a Z-axis detection acceleration value. Incidentally, the X axis from among the three axes for acceleration detection is an axis extending perpendicularly to or substantially coincident with the horizontal rotation axis L1 of the ellipsoidal housing member 2 and also is an axis substantially parallel to the leftward and rightward direction with respect to the ellipsoidal housing member 2. Meanwhile, the Z axis is an axis substantially parallel to the vertical direction when the ellipsoidal housing member 2 has the reference position and also is an axis substantially parallel to the upward and downward direction with respect to the ellipsoidal housing member 2. Further, the Y axis is an axis perpendicular to the horizontal rotation axis L1 and also to the vertical direction when the ellipsoidal housing member 2 is in the reference posture, and also is an axis substantially parallel to the forward and backward direction with respect to the ellipsoidal housing member 2.

The control section 30 stores accelerations in the three axes (X axis, Y axis and Z axis) when the ellipsoidal housing member 2 is in a state wherein it is placed on the substantially horizontal floor and the movable components are kept stationary without being operated as an X-axis reference acceleration value, a Y-axis reference acceleration value and a Z-axis reference acceleration value, for example, in the internal memory in advance. Incidentally, the X-axis reference acceleration value, Y-axis reference acceleration value and Z-axis reference acceleration value additionally include information that the floor placed on the ellipsoidal housing member 2 is not always completely horizontal. The X-axis reference acceleration value, Y-axis reference acceleration value and Z-axis reference acceleration value further include information of allowable ranges selected around the center values given by the X-axis reference acceleration value, Y-axis reference acceleration value and Z-axis reference acceleration value, respectively, taking detection errors of the accelerations by the acceleration sensor section 32 and so forth into consideration. Then, if an X-axis detection acceleration value, a Y-axis detection acceleration value and a Z-axis detection acceleration value are received from the acceleration sensor section 32, then the control section 30 compares them with the corresponding X-axis reference acceleration value, Y-axis reference acceleration value and Z-axis reference acceleration value, respectively.

As a result, if the X-axis detection acceleration value, Y-axis detection acceleration value and Z-axis detection acceleration value are included in the allowable ranges centered at the X-axis reference acceleration value, Y-axis reference acceleration value and Z-axis reference acceleration value, respectively, then the control section 30 discriminates that the ellipsoidal housing member 2 is in a stopping state. On the other hand, if the X-axis detection acceleration value, Y-axis detection acceleration value and Z-axis detection acceleration value are displaced from the allowable ranges centered at the X-axis reference acceleration value, Y-axis reference acceleration value and Z-axis reference acceleration value, respectively, then the control section 30 discriminates that the ellipsoidal housing member 2 is moved, for example, by an external force applied by the user. In this manner, the control section 30 detects whether or not the ellipsoidal housing member 2 is moved by an external force.

If the control section 30 detects based on a result of the detection of the accelerations by the acceleration sensor section 32, for example, that the ellipsoidal housing member 2 is moved from a state wherein it is placed stationarily on the floor so as to be lifted by a hand of a user and then detects that a finger, a hand or the like user is brought into contact with the contact detection sensor element 15 provided on the surface of the housing central member 3, then it enters an instruction input mode. If, in this state, the control section 30 detects based on a result of the detection of the accelerations by the acceleration sensor section 32 that the ellipsoidal housing member 2 is swung at an acceleration higher than a predetermined value, then it decides the swinging direction in which the ellipsoidal housing member 2 is swung. As a result, if the control section 30 recognizes that the swinging direction of the ellipsoidal housing member 2 is a direction for providing an instruction to start reproduction of music data, then it starts readout of music data stored in the storage section 31. Further, the control section 30 controls a music processing section 33 to perform a predetermined music reproduction process such as a digital to analog conversion process and an amplification process for the read out music data, and a resulting music signal is signaled to the right speaker 10 and the left speaker 11. In this manner, the control section 30 can cause music based on the music data stored in the storage section 31 to be outputted from the right speaker 10 and the left speaker 11 and enjoyed by the user.

Then, if the control section 30 detects based on a result of the detection of the accelerations by the acceleration sensor section 32 that the ellipsoidal housing member 2 is placed on the floor such that both of the right side wheel 12 and the left side wheel 13 contact with the floor, then it executes a reproduction tune operation process of controlling the movable elements of the ellipsoidal housing member 2 and the right side light emitting element 16 and left side light emitting element 17 in response to a tune (tempo, musical interval and so forth) of music based on the music data being processed for reproduction. In this instance, the control section 30 reads out driving section control information INF2 and driving information corresponding to the music data being processed for reproduction from the storage section 31 and controls a wheel driving section 34, a rotational driving section 35 and a opening and closing driving section 36 based on the driving section control information INF2. Further, the control section 30 controls and drives the right side light emitting element 16 and the left side light emitting element 17 based on the driving information. Consequently, the wheel driving section 34 drives the right side wheel 12 and the left side wheel 13 to rotate in the first rotational direction D1 and the opposite second direction in response to the tune of the music based on the music data being processed for reproduction. As a result, the control section 30 controls the ellipsoidal housing member 2 to travel stably on the floor in synchronism with the tune of the music being outputted from the right speaker 10 and the left speaker 11.

Meanwhile, the rotational driving section 35 drives the housing right side rotatable member 4 and the housing left side rotatable member 5 to rotate in the first rotational direction D1 and the opposite second direction around the axis in response to the tune of the music based on the music data being processed for reproduction. Further, the opening and closing driving section 36 drives the housing right side opening/closing member 6 and housing left side opening/closing member 7 to open and close in response to the tune of the music based on the music data being processed for reproduction. Consequently, the control section 30 causes the housing right side opening/closing member 6 and the housing left side opening/closing member 7 to open and close while it causes the housing right side rotatable member 4 and the housing left side rotatable member 5 to rotate in synchronism with the tune of the music being outputted from the right speaker 10 and the left speaker 11. Furthermore, the control section 30 causes the right side light emitting element 16 and the left side light emitting element 17 to emit light in various light emitting states in response to the tune of the music based on the music data being processed for reproduction. Consequently, the control section 30 causes the right side light emitting element 16 and the left side light emitting element 17 to emit light in synchronism with the tune of the music being outputted from the right speaker 10 and the left speaker 11. In this manner, when a reproduction process of music data is performed, the music reproduction robot apparatus 1 can operate as if the music reproduction robot apparatus 1 itself danced in accordance with music being reproduced.

Incidentally, after the control section 30 enters the instruction input mode, it allows various instructions to be inputted such as an instruction to reproduce or stop reproduction of music data or to perform fast feeding or rewinding for changeover of music data for a reproduction process in response to a swinging direction in which the ellipsoidal housing member 2 is swung.

The music reproduction robot apparatus according to the embodiment of the present invention described above travels making use of the force of friction generated between the two wheels and the ground when only the two wheels contact with the ground and rotate as seen in FIG. 1A.

Figure 11:
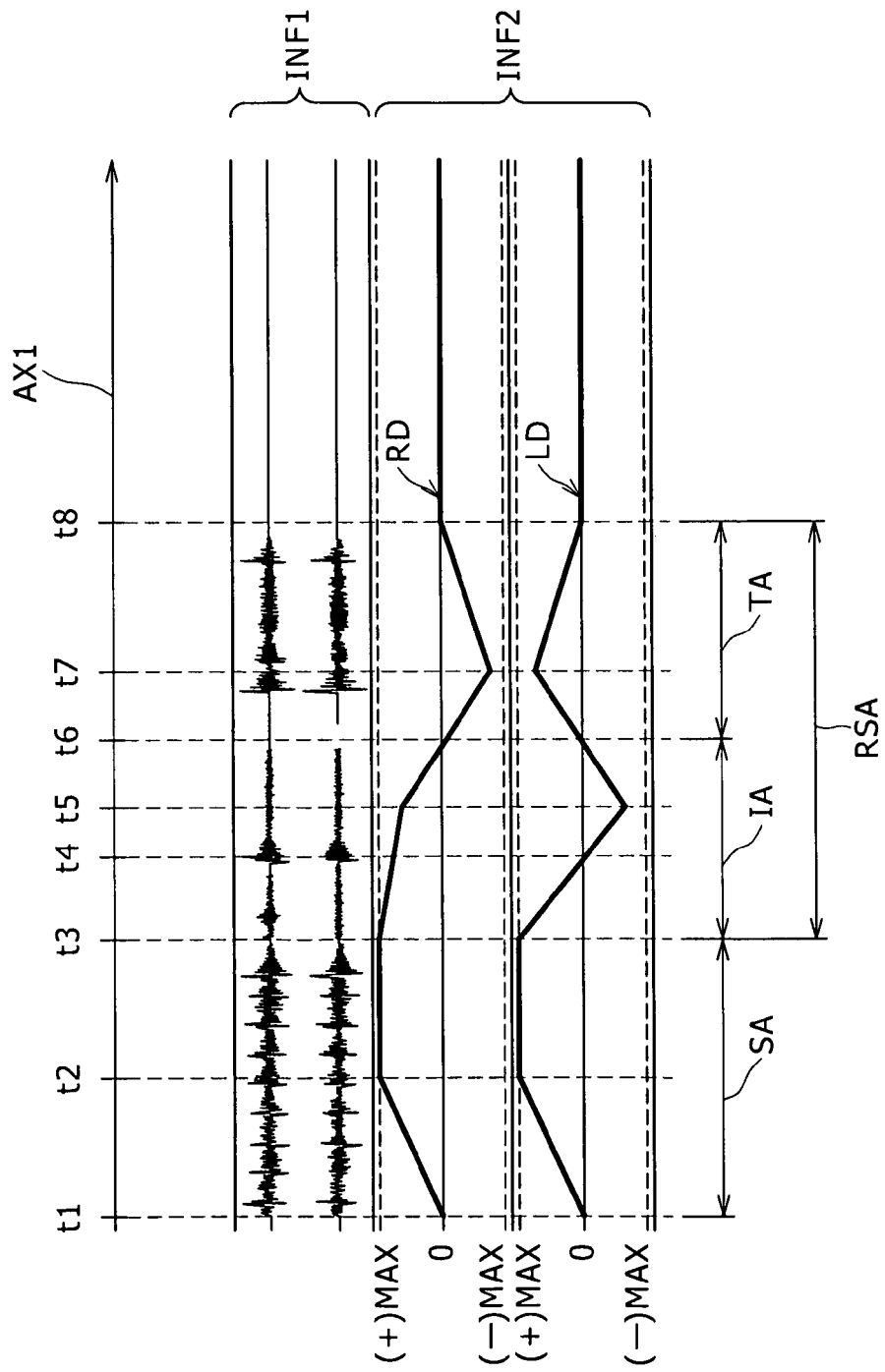
FIG. 11 is a waveform diagram illustrating a right side wheel driving instruction value and a left side wheel driving instruction value included in the driving section control information.

Incidentally, as seen in FIG. 11, the driving section control information INF2 described hereinabove includes an instruction value (hereinafter referred to as right side wheel driving instruction value) RD which indicates the direction and the speed of rotation of the right side wheel 12 and varies along the reproduction time axis AX1. The driving section control information INF2 further includes an instruction value (hereinafter referred to as left side wheel driving instruction value) LD which indicates the direction and the speed of rotation of the left side wheel 13 and varies along the reproduction time axis AX1. The right side wheel driving instruction value RD and the left side wheel driving instruction value LD indicate, when they have the value "0", that the right side wheel 12 and the left side wheel 13 are not rotated in any of the first rotational direction D1 and the opposite second direction. Further, the right side wheel driving instruction value RD and the left side wheel driving instruction value LD indicate, when they have, for example, a positive value, that the right side wheel 12 and the left side wheel 13 are rotated in the first rotational direction D1 around the axis and further indicate the speed of rotation then. On the other hand, the right side wheel driving instruction value RD and the left side wheel driving instruction value LD indicate, when they have, for example, a negative value, that the right side wheel 12 and the left side wheel 13 are rotated in the opposite second direction around the axis and further indicate the speed of rotation then. Further, when the right side wheel driving instruction value RD and the left side wheel driving instruction value LD have a positive value or a negative value, the speed of rotation increases as the absolute value of the positive or negative value increases (in other words, the speed of rotation increases in proportion to the magnitude of the absolute value of the positive or negative value).

Figure 12:
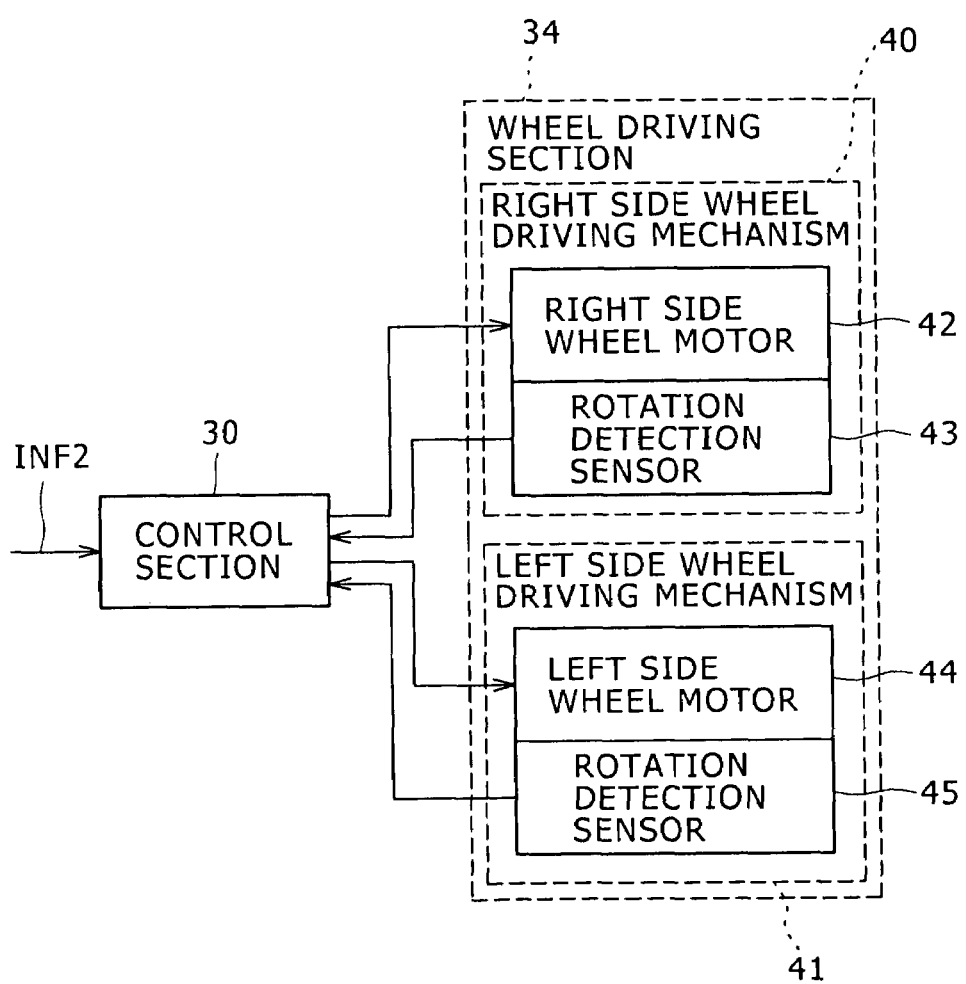
FIG. 12 is a block diagram showing a circuit of a wheel driving section shown in FIG. 9.

Referring now to FIG. 12, the wheel driving section 34 includes a right side wheel driving mechanism 40 and a left side wheel driving mechanism 41. The right side wheel driving mechanism 40 includes a right side wheel motor 42 in the form of a brushless motor or the like for driving the right side wheel 12 to rotate in the first rotational direction D1 or the opposite second direction around the axis and a rotation detection sensor 43 in the form of a rotary encoder or the like for detecting the direction and the speed of rotation of the output power shaft of the right side wheel motor 42. Meanwhile, the left side wheel driving mechanism 41 includes a left side wheel motor 44 in the form of a brushless motor or the like for driving the left side wheel 13 to rotate in the first rotational direction D1 or the opposite second direction around the axis and a rotation detection sensor 45 in the form of a rotary encoder or the like for detecting the direction and the speed of rotation of the output power shaft of the left side wheel motor 44.

Upon starting of the reproduction tune operation process, the control section 30 produces, based on the right side wheel driving instruction value RD included in the driving section control information INF2, a driving signal for causing the output power shaft of the right side wheel motor 42 of the right side wheel driving mechanism 40 to rotate in a direction and at a speed indicated by the right side wheel driving instruction value RD. The control section 30 signals the produced driving signal to the right side wheel motor 42. Consequently, the right side wheel motor 42 rotates the output power shaft thereof in response to the driving signal received from the control section 30. The rotation of the output power shaft of the right side wheel motor 42 is transmitted to the right side wheel 12 so that the right side wheel 12 is rotated. When the output power shaft of the right side wheel motor 42 begins to rotate, the rotation detection sensor 43 of the right side wheel driving mechanism 40 signals a rotation detection signal, which is, for example, a rectangular pulse signal representative of the direction and the speed of rotation of the output power shaft of the right side wheel motor 42, to the control section 30.

When the rotation detection signal is received from the rotation detection sensor 43 of the right side wheel driving mechanism 40, the control section 30 produces a right side wheel detection value representative of the direction and the speed of rotation of the output power shaft of the right side wheel motor 42 based on the rotation detection signal. Then, the control section 30 subtracts the right side wheel detection value from the right side wheel driving instruction value RD to be used for driving rotation of the right side wheel 12 at the point of time and produces, based on a resulting difference value, a driving signal for rotating the output power shaft of the right side wheel motor 42 in the direction and at the speed of rotation indicated by the difference value. The driving signal produced in this manner is signaled to the right side wheel motor 42. As a result, the right side wheel motor 42 of the right side wheel driving mechanism 40 further rotates the output power shaft thereof in response to the driving signal received from the control section 30, and the rotation of the output power shaft of the right side wheel motor 42 is transmitted to the right side wheel 12 so that the right side wheel 12 is rotated. In this manner, while the control section 30 executes the reproduction tune operation process, it forms a feedback loop together with the right side wheel motor 42 and the rotation detection sensor 43 of the right side wheel driving mechanism 40 to feedback control the right side wheel motor 42.

Meanwhile, upon starting of the reproduction tune operation process, the control section 30 produces, based on the left side wheel driving instruction value LD included in the driving section control information INF2, a driving signal for causing the output power shaft of the left side wheel motor 44 of the left side wheel driving mechanism 41 to rotate in a direction and at a speed of rotation indicated by the left side wheel driving instruction value LD. The control section 30 signals the produced driving signal to the left side wheel motor 44. Consequently, the left side wheel motor 44 rotates the output power shaft thereof in response to the driving signal received from the control section 30. The rotation of the output power shaft of the left side wheel motor 44 is transmitted to the left side wheel 13 so that the left side wheel 13 is rotated. When the output power shaft of the left side wheel motor 44 begins to rotate, the rotation detection sensor 45 of the left side wheel driving mechanism 41 signals a rotation detection signal, which is, for example, a rectangular pulse signal representative of the direction and the speed of rotation of the output power shaft of the left side wheel motor 44, to the control section 30.

When the rotation detection signal is received from the rotation detection sensor 45 of the left side wheel driving mechanism 41, the control section 30 produces a left side wheel detection value representative of the direction and the speed of rotation of the output power shaft of the left side wheel motor 44 based on the rotation detection signal. Then, the control section 30 subtracts the left side wheel detection value from the left side wheel driving instruction value LD to be used for driving rotation of the left side wheel 13 at the point of time and produces, based on a resulting difference value, a driving signal for rotating the output power shaft of the left side wheel motor 44 in the direction and at the speed of rotation indicated by the different value. The driving signal produced in this manner is signaled to the left side wheel motor 44. As a result, the left side wheel motor 44 of the left side wheel driving mechanism 41 further rotates the output power shaft thereof in response to the driving signal received from the control section 30, and the rotation of the output power shaft of the left side wheel motor 44 is transmitted to the left side wheel 13 so that the right side wheel 12 is rotated. In this manner, while the control section 30 executes the reproduction tune operation process, it forms a feedback loop together with the left side wheel motor 44 and the rotation detection sensor 45 of the left side wheel driving mechanism 41 to feedback control the left side wheel motor 44.

In this manner, the control section 30 can control the right side wheel motor 42 of the right side wheel driving mechanism 40 and the left side wheel motor 44 of the left side wheel driving mechanism 41 individually to drive the right side wheel 12 and the left side wheel 13 to rotate. Thus, if the right side wheel 12 and the left side wheel 13 are driven to rotate in the same direction and at an equal speed, then the ellipsoidal housing member 2 can travel straightforwardly in a direction (hereinafter referred to as straightforward direction) in which the ellipsoidal housing member 2 can travel straightforwardly in a forward direction or a rearward direction (such traveling of the ellipsoidal housing member 2 is hereinafter referred to as straightforward traveling). On the other hand, if the control section 30 causes the right side wheel 12 and the left side wheel 13 to be driven to rotate at an equal speed but in the opposite directions, then the ellipsoidal housing member 2 can travel in such a manner as to revolve at the place (such traveling is hereinafter referred to particularly as revolutionary traveling). Further, if the control section 30 causes the right side wheel 12 and the left side wheel 13 to be driven to rotate in the same direction but at different speeds from each other, then the ellipsoidal housing member 2 can travel in such a manner that it turns to the right or the left (such traveling is hereinafter referred to particularly as turning traveling). It is to be noted that the ellipsoidal housing member 2 can travel in a greater number of patterns if the control section 30 controls the right side wheel motor 42 of the right side wheel driving mechanism 40 and the left side wheel motor 44 of the left side wheel driving mechanism 41 in different control manners. For example, if the right side wheel motor 42 is stopped while only the left side wheel motor 44 of the left side wheel driving mechanism 41 is driven, then the ellipsoidal housing member 2 can move along a circle at a fixed place centered at the contacting point of the ground with the right side wheel.

Actually, when the ellipsoidal housing member 2 is to travel straightforwardly, for example, in the forward direction, the control section 30 controls the wheel driving section 34 to start driving of the right side wheel 12 and the left side wheel 13 to rotate, for example, in the same first rotational direction D1 at time t1 along the reproduction time axis AX1 in accordance with the right side wheel driving instruction value RD and the left side wheel driving instruction value LD illustrated in FIG. 11, respectively. The control section 30 further controls the wheel driving section 34 to increase the speeds of rotation of the right side wheel 12 and the left side wheel 13 at an equal rate toward time t2. Then, the control section 30 causes both of the right side wheel 12 and the left side wheel 13 to be driven to rotate at an equal fixed speed after time t2 along the reproduction time axis AX1. In this manner, within an interval (hereinafter referred to as straightforward operation interval) SA from time t1 to time t3 along the reproduction time axis AX1, the control section 30 causes the right side wheel 12 and the left side wheel 13 to rotate in the same conditions in accordance with the right side wheel driving instruction value RD and the left side wheel driving instruction value LD. Consequently, the control section 30 gradually accelerates the ellipsoidal housing member 2 from a stopping state while the ellipsoidal housing member 2 travels straightforwardly within the straightforward operation interval SA. Then, after a fixed speed is reached, the control section 30 causes the ellipsoidal housing member 2 to travel straightforwardly as it is. Incidentally, in the following description, the surface of the ellipsoidal housing member 2 which is directed in the straightforwardly traveling direction when the ellipsoidal housing member 2 travels straightforwardly in the forward direction is referred to as housing front surface.

Then, when the ellipsoidal housing member 2 in a state wherein it is traveling straightforwardly at a fixed speed in this manner is to be stopped, the control section 30 causes the right side wheel 12 to gradually decrease the speed of rotation at a predetermined rate within a period from time t3 to time t4 along the reproduction time axis AX1 of music data in accordance with the right side wheel driving instruction value RD and then gradually decrease the speed of rotation at an increased rate within another period from time t4 to t5. Then, the control section 30 causes the right side wheel 12 to reduce the speed of rotation suddenly at a further increased rate within a further period of time from time t5 to time t6 along the reproduction time axis AX1 until the rotation of the right side wheel 12 stops once. Meanwhile, the control section 30 causes the left side wheel 13 to decrease the speed of rotation suddenly at a predetermined rate within the period of time from time t3 to time t4 along the reproduction time axis AX1 in accordance with the left side wheel driving instruction value LD and then reverse the direction of rotation at time t4 so that the left side wheel 13 now rotates in the opposite direction to the first rotational direction D1 around the axis. Thereafter, the control section 30 causes the left side wheel 13 to increase the speed of rotation thereof suddenly at a predetermined rate till time t5. Then, within the period of time from time t5 to time t6 along the reproduction time axis AX1, the control section 30 causes the left side wheel 13 to reduce the speed of rotation suddenly until the left side wheel 13 stops its rotation once.

In this manner, within an interval (hereinafter referred to as first direction rotational operation interval) IA from time t3 to time t6 along the reproduction time axis AX1 of music data, the control section 30 causes the right side wheel 12 and the left side wheel 13 to be driven to rotate in different conditions in accordance with the right side wheel driving instruction value RD and the left side wheel driving instruction value LD, respectively. Incidentally, the right side wheel driving instruction value RD and the left side wheel driving instruction value LD included in the driving section control information INF2 are selected so that, although they indicate different directions of rotation from each other within the period from time t5 to time t6, the speeds of rotation of the right side wheel 12 and the left side wheel 13 are reduced substantially at an equal rate until the driving rotation of the right side wheel 12 and the left side wheel 13 is stopped once.

Figure 13:
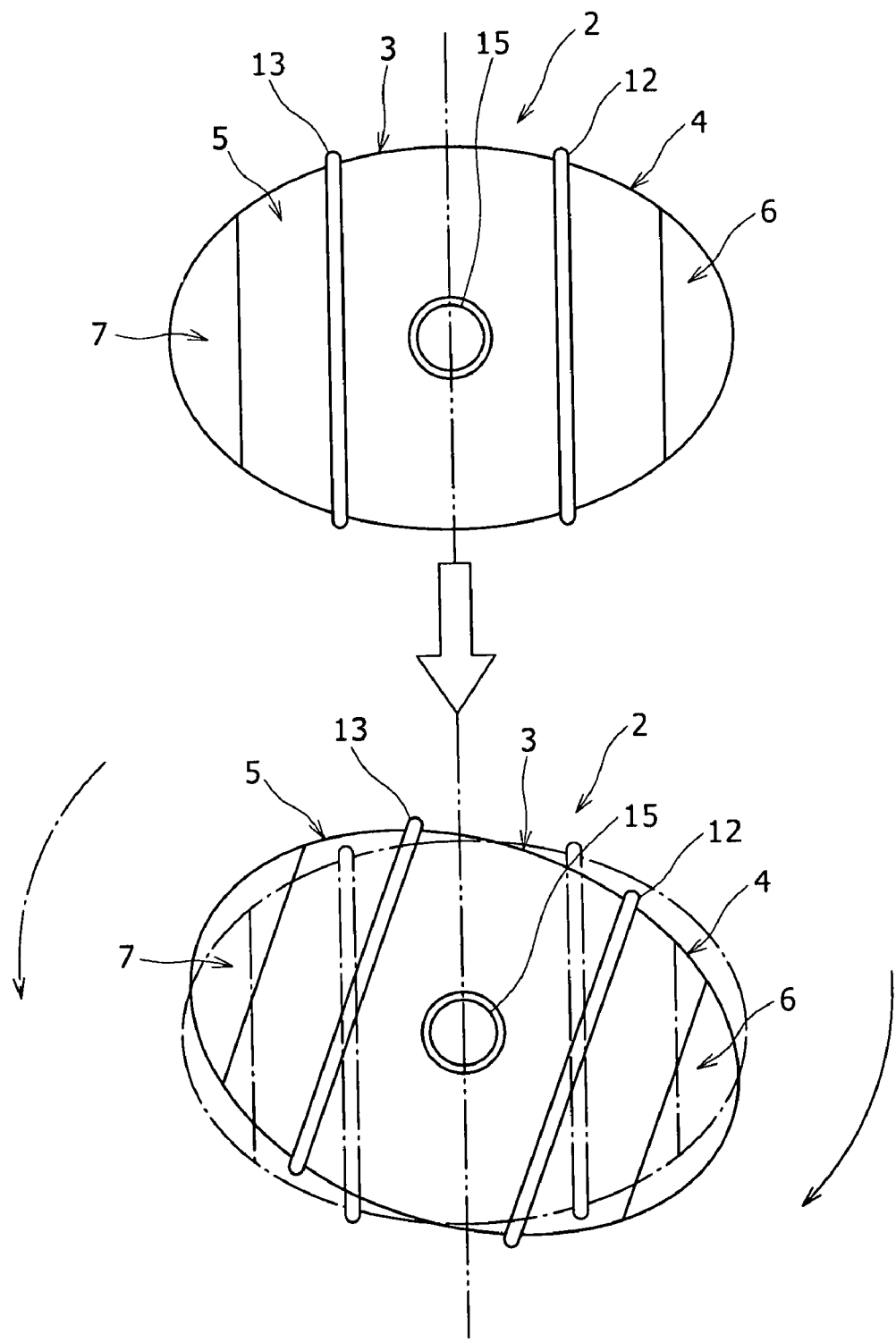
FIG. 13 is a schematic top plan view illustrating stopping of traveling from straightforward traveling of an ellipsoid housing member of the music reproduction robot apparatus.
Figure 14:
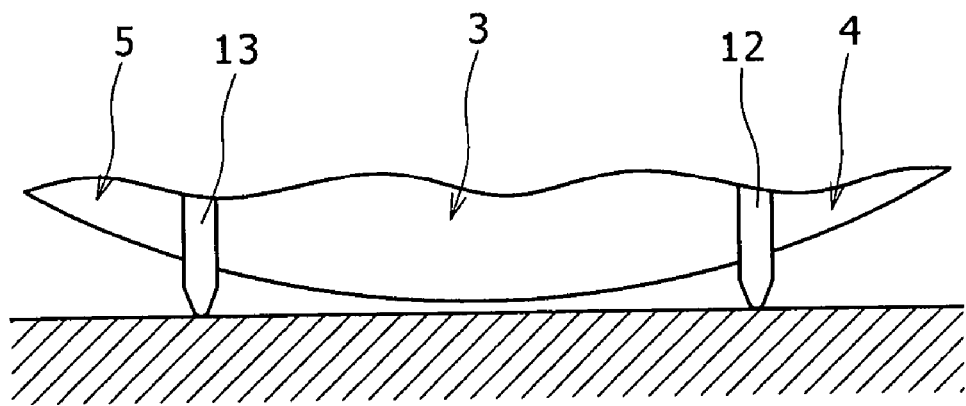
FIG. 14 is a schematic front elevational view showing a surface shape of a right side wheel and a left side wheel.

Accordingly, as seen in FIG. 13, the control section 30 starts a traveling stopping action of stopping straightforward traveling of the ellipsoidal housing member 2 at time t3 along the reproduction time axis AX1. Then, at the place at which the ellipsoidal housing member 2 arrives then (that is, a place called hereinafter a traveling stopping position), the control section 30 causes the right side portion of the ellipsoidal housing member 2 to travel a little in the straightforward direction while it causes the left side portion of the ellipsoidal housing member 2 to travel a little in a direction opposite to the straightforward direction (that is, to retreat a little). By the control just described, the control section 30 causes the ellipsoidal housing member 2 to revolve by a predetermined angle in the rightward direction at the traveling stopping position so as to direct the housing front surface, for example, to the right side from the straightforwardly traveling direction and then causes the right side wheel 12 and the left side wheel 13 to stop the driving rotation once. As a result, the control section 30 converts an inertial force (hereinafter referred to as straightforward inertial force) which has been produced by the straightforward traveling of the ellipsoidal housing member 2 till then and acts to cause the ellipsoidal housing member 2 to travel straightforwardly into another inertial force (hereinafter referred to as first revolutionary inertial force) which acts to revolve the ellipsoidal housing member 2 in the rightward direction by revolution of the ellipsoidal housing member 2 in the rightward direction.

After the control section 30 (FIG. 11) causes the ellipsoidal housing member 2 to turn to the rightward direction once from a state in which it travels straightforwardly in this manner, it causes the right side wheel 12 to reverse the direction of rotation at time t6 along the reproduction time axis AX1 of music data in accordance with the right side wheel driving instruction value RD (that is, to cause the right side wheel 12 to rotate in the reverse direction from the first rotational direction D1 around the axis). Then, the control section 30 causes the right side wheel 12 to increase the speed of rotation suddenly at a predetermined rate till time t7 and then gradually decrease the speed of rotation until the rotation of the right side wheel 12 stops at time t8. Meanwhile, the control section 30 causes the left side wheel 13 to reverse the direction of rotation again at time t6 along the reproduction time axis AX1 of music data in accordance with the left side wheel driving instruction value LD (that is, to cause the right side wheel 12 to rotate reversely in the first rotational direction D1 from the opposite second direction). Then, the control section 30 causes the left side wheel 13 to increase the speed of rotation suddenly at a predetermined rate till time t7 and then gradually decrease the speed of rotation until the rotation is stopped at time t8.

In this manner, also within an interval (hereinafter referred to as second direction rotational operation interval) TA from time t6 to time t8 along the reproduction time axis AX1 of the music data, the control section 30 drives the right side wheel 12 and the left side wheel 13 to rotate in different conditions in accordance with the right side wheel driving instruction value RD and the left side wheel driving instruction value LD. Incidentally, the right side wheel driving instruction value RD and the left side wheel driving instruction value LD are selected to such values that, within the period from time t6 to time t7, the right side wheel 12 and the left side wheel 13 are rotated in directions reverse to those in which they are rotated till time t6, and the speeds of rotation of the right side wheel 12 and the left side wheel 13 are increased at a substantially equal rate to drive the right side wheel 12 and the left side wheel 13 to rotate again. Further, the right side wheel driving instruction value RD and the left side wheel driving instruction value LD are selected to such values that, while they rotate in the opposite directions to each other within the period of time from time t7 to time t8, the speeds of rotation of them are reduced at a substantially equal rate until the rotation of the right side wheel 12 and the left side wheel 13 is stopped.

Accordingly, after the ellipsoidal housing member 2 is revolved to the rightward direction, the control section 30 (FIG. 13) suddenly increases the speed of rotation of the right side wheel 12 and the left side wheel 13 once and then decrease the speed gradually while the right side wheel 12 and the left side wheel 13 rotate in the opposite directions to each other so that the right side portion of the ellipsoidal housing member 2 is moved back a little in the opposite direction to the straightforward direction (that is, moved rearwardly) while the left side portion of the ellipsoidal housing member 2 is moved forwardly a little in the straightforward direction. Consequently, the control section 30 causes the ellipsoidal housing member 2 to revolve, substantially at the traveling stopping position, by a predetermined angle toward the leftward direction so that the housing front surface is directed to the straightforward direction from the revolved position by the predetermined angle toward the rightward direction and then causes the driving rotation of the right side wheel 12 and the left side wheel 13 to stop completely. As a result, the control section 30 cancels most of the first revolutionary inertial force, into which the straightforward direction inertial force has been converted by the revolution of the ellipsoidal housing member 2 toward the rightward direction, with an inertial force (hereinafter referred to as second revolutionary inertial force) which is caused by the revolution toward the leftward direction and acts to revolve the ellipsoidal housing member 2 toward the leftward direction.

When the control section 30 causes the ellipsoidal housing member 2 to stop, in a state wherein the ellipsoidal housing member 2 is traveling straightforwardly at a comparatively low speed, the traveling in an interval (hereinafter referred to as traveling stopping operation period) RSA from time t3 to time t8 along the reproduction time axis AX1 of music data, by revolving the ellipsoidal housing member 2 toward the rightward direction once at the traveling stopping place and then revolving the ellipsoidal housing member 2 toward the leftward direction, the first revolutionary inertial force converted from the forwardly traveling inertial force by the revolution toward the rightward direction can be almost cancelled with the second revolutionary inertial force produced by the revolution toward the leftward direction. However, when traveling of the ellipsoidal housing member 2 is to be stopped in a state wherein the ellipsoidal housing member 2 is traveling straightforwardly at a comparatively high speed, the control section 30 may possibly fail to fully cancel the first revolutionary inertial force converted from the straightforward direction inertial force by revolution of the ellipsoidal housing member 2 toward the rightward direction at the traveling stopping position with the second revolutionary inertial force produced by the succeeding revolution toward the leftward direction.

Therefore, in the present music reproduction robot apparatus 1, the right side wheel 12 and the left side wheel 13 are made of a resilient material such as rubber whose elastic modulus is selected suitably. Accordingly, when the control section 30 fails to fully cancel the first revolutionary inertial force converted from the straightforward direction inertial force by revolution of the ellipsoidal housing member 2 toward the rightward direction at the traveling stopping position with the second revolutionary inertial force produced by the succeeding revolution toward the leftward direction, the small first revolutionary inertial force which remains without being canceled is absorbed by the force of friction at the contacting portions of the right side wheel 12 and the left side wheel 13 with the floor which appears when the ellipsoidal housing member 2 is revolved toward the leftward direction and also by deformation of the contacting portions of the right side wheel 12 and the left side wheel 13 with the floor. Consequently, even when the ellipsoidal housing member 2 travels straightforwardly at a comparatively low speed or a comparatively high speed, the control section 30 can substantially cancel the straightforward direction inertial force to cause the ellipsoidal housing member 2 to stop the traveling precisely.

Further, each of the right side wheel 12 and the left side wheel 13 is formed in a mountain-like shape of a U- or V-shaped cross section such that a surface thereof (that is, a surface on the side which is to contact with the floor) projects outwardly at a central portion thereof over an overall circumference. Thus, the contacting portion of each of the right side wheel 12 and the left side wheel 13 with the floor when the ellipsoidal housing member 2 is placed on the floor is not formed as a face so as to minimize the contact area. Therefore, when the ellipsoidal housing member 2 is revolved successively toward the right direction and then toward the left direction in order to stop traveling of the ellipsoidal housing member 2 from a straightforwardly traveling state, the ellipsoidal housing member 2 can be revolved smoothly without suffering from side slipping. Consequently, the control section 30 can precisely convert the straightforward direction inertial force generated on the ellipsoidal housing member 2 by straightforward traveling into a first revolutionary inertial force by revolving the ellipsoidal housing member 2 toward the rightward direction. Further, the control section 30 can precisely generate a second revolutionary inertial force capable of almost canceling the first revolutionary inertial force when the ellipsoidal housing member 2 is revolved toward the leftward direction.

It is to be noted that, in the present embodiment described above, when the ellipsoidal housing member 2 which is traveling straightforwardly is to be stopped, the control section 30 causes the ellipsoidal housing member 2 to revolve toward the rightward direction once and then revolve toward the leftward direction. However, also if the control section 30 causes the ellipsoidal housing member 2 traveling straightforwardly to revolve toward the leftward direction once and then revolve toward the rightward direction conversely, the ellipsoidal housing member 2 can be stopped similarly.

Further, the control section 30 can control the wheel driving section 34 to drive the right side wheel 12 and the left side wheel 13 to rotate in the same conditions to cause the ellipsoidal housing member 2 to travel straightforwardly in the backward direction. Also when the control section 30 causes the ellipsoidal housing member 2 to travel straightforwardly in the backward direction, it controls the wheel driving section 34 to drive the right side wheel 12 and the left side wheel 13 to rotate in different conditions from each other in a similar manner as described hereinabove. Consequently, the control section 30 causes the ellipsoidal housing member 2, which is traveling straightforwardly in the backward direction, to revolve, substantially at the traveling stopping position, by a predetermined angle toward the rightward direction so that the surface of the housing which has been directed in the straightforward direction which is the backward direction (the surface is hereinafter referred to as housing rear surface) is directed, for example, to the right side from the straightforward direction and then causes the driving rotation of the right side wheel 12 and the left side wheel 13 to stop once. As a result, the control section 30 precisely converts the straightforward direction inertial force generated on the ellipsoidal housing member 2 by straightforward traveling into a first revolutionary inertial force by revolving the ellipsoidal housing member 2 toward the rightward direction. Thereafter, the control section 30 causes the ellipsoidal housing member 2 to revolve, substantially at the traveling stopping position, by the predetermined angle toward the leftward direction so that the housing rear surface is directed back to the straightforward direction from the revolved direction by the predetermined angle toward the rightward direction and then causes the driving rotation of the right side wheel 12 and the left side wheel 13 to stop completely. As a result, the control section 30 cancels almost all of the first revolutionary inertial force, into which the straightforward direction inertial force has been converted by the revolution of the ellipsoidal housing member 2 toward the rightward direction, with the second revolutionary inertial force which is generated by the revolution toward the leftward direction. In this manner, also when the control section 30 causes the ellipsoidal housing member 2 to travel straightforwardly in the backward direction, the straightforward direction inertial force can be almost eliminated to allow the ellipsoidal housing member 2 to stop the traveling precisely.

In the music reproduction robot apparatus 1 having the configuration described above, the control section 30 controls the wheel driving section 34 to drive the right side wheel 12 and the left side wheel 13 to rotate in the same conditions (same conditions in accordance with the right side wheel driving instruction value RD and the left side wheel driving instruction value LD within the straightforward operation interval SA illustrated in FIG. 11) to cause the ellipsoidal housing member 2 to travel straightforwardly in the forward direction or the backward direction. Then, in the music reproduction robot apparatus 1, when the ellipsoidal housing member 2 traveling straightforwardly is to be stopped, the control section 30 controls the wheel driving section 34 to drive the right side wheel 12 and the left side wheel 13 to rotate in different conditions from each other (different conditions in accordance with the right side wheel driving instruction value RD and the left side wheel driving instruction value LD within the traveling stopping operation period RSA illustrated in FIG. 11) to revolve the ellipsoidal housing member 2 toward one of the rightward direction and the leftward direction with respect to the straightforward direction and then revolve the ellipsoidal housing member 2 toward the other of the rightward and leftward directions so as to direct the housing front surface or the housing rear surface toward the straightforward direction and then stops the driving rotation of the right side wheel 12 and the left side wheel 13.

Accordingly, in the music reproduction robot apparatus 1, when the ellipsoidal housing member 2 traveling straightforwardly is to be stopped, the first revolutionary inertial force, into which the straightforward direction inertial force generated on the ellipsoidal housing member 2 by the straightforward travel is converted by the revolution of the ellipsoidal housing member 2 toward one direction, can be almost canceled with the second revolutionary inertial force generated by the revolution of the ellipsoidal housing member 2 toward the other direction, and then the driving rotation of the right side wheel 12 and the left side wheel 13 is stopped. In other words, in the music reproduction robot apparatus 1, when the ellipsoidal housing member 2 traveling straightforwardly is to be stopped, the ellipsoidal housing member 2 can be revolved toward one direction once and then revolved toward the other direction to almost cancel the straightforward direction inertial force generated by the straightforward travel to stop the traveling. Therefore, in the music reproduction robot apparatus 1, when the ellipsoidal housing member 2 traveling straightforwardly is to be stopped, even if the driving rotation of right side wheel 12 and the left side wheel 13 is stopped, such a situation that the ellipsoidal housing member 2 is caused to roll to the straightforward direction side by the straightforward direction inertial force can be prevented almost with certainty.

In the music reproduction robot apparatus 1 having the configuration described above, the control section 30 controls the wheel driving section 34 to drive the right side wheel 12 and the left side wheel 13 to rotate in the same condition to cause the ellipsoidal housing member 2 to travel straightforwardly. Then, when the traveling of the ellipsoidal housing member 2 is to be stopped, the control section 30 controls the wheel driving section 34 to drive the right side wheel 12 and the left side wheel 13 to rotate in different conditions to each other to revolve the ellipsoidal housing member 2 toward one of the rightward direction and the leftward direction with respect to the straightforward direction and then revolve the ellipsoidal housing member 2 toward the other of the rightward and leftward directions, and then the driving rotation of the right side wheel 12 and the left side wheel 13 is stopped. Consequently, in the music reproduction robot apparatus 1, when the ellipsoidal housing member 2 is to be stopped after it is caused to travel straightforwardly, the straightforward direction inertial force generated in the ellipsoidal housing member 2 by the straightforward travel is canceled by the successive revolutions of the ellipsoidal housing member 2 toward one and the other directions. As a result, even if the driving rotation of the right side wheel 12 and the left side wheel 13 is stopped, such a situation that the ellipsoidal housing member 2 is caused to roll to the straightforward direction side can be prevented almost with certainty. Consequently, the music reproduction robot apparatus 1 can stop its straightforward traveling readily.

Further, the right side wheel 12 and the left side wheel 13 provided in the music reproduction robot apparatus 1 are made of an elastic substance. Accordingly, even if the music reproduction robot apparatus 1 fails to fully cancel the first revolutionary inertial force converted from the straightforward direction inertial force by revolution of the ellipsoidal housing member 2 toward one direction at the traveling stopping position with the second revolutionary inertial force produced by the succeeding revolution toward the other direction, the small first revolutionary inertial force which remains without being canceled is absorbed by the force of friction at the contacting portions of the right side wheel 12 and the left side wheel 13 with the floor which appears when the ellipsoidal housing member 2 is revolved toward the other direction and also by deformation of the contacting portions of the right side wheel 12 and the left side wheel 13 with the floor. Consequently, even when the ellipsoidal housing member 2 travels straightforwardly at a comparatively high speed, the music reproduction robot apparatus 1 can stop (suddenly stop) the traveling of the ellipsoidal housing member 2 precisely without allowing the ellipsoidal housing member 2 to roll to the straightforward direction.

In addition, in the music reproduction robot apparatus 1, each of the right side wheel 12 and the left side wheel 13 is formed in a mountain-like shape such that a surface thereof projects outwardly at a central portion thereof over an overall circumference. Thus, the contacting portion of each of the right side wheel 12 and the left side wheel 13 with the floor is not formed as a face so as to minimize the contact area. Therefore, when the ellipsoidal housing member 2 is revolved successively toward one direction and then toward the other direction in order to stop traveling of the ellipsoidal housing member 2 from a straightforwardly traveling state, the ellipsoidal housing member 2 can be revolved smoothly without suffering from side slipping. Consequently, the music reproduction robot apparatus 1 can precisely convert the straightforward direction inertial force generated on the ellipsoidal housing member 2 into a first revolutionary inertial force by revolving the ellipsoidal housing member 2 toward one direction. Further, the music reproduction robot apparatus 1 can precisely generate a second revolutionary inertial force capable of almost canceling the first revolutionary inertial force when the ellipsoidal housing member 2 is revolved toward the other direction. As a result, upon stopping of traveling, the straightforward direction inertial force can be canceled almost with certainty.

Furthermore, in the music reproduction robot apparatus 1, the center of gravity of the housing central member 3 is displaced from the central point P1 by the location of the weight 14 so as to be positioned as near as possible to the floor. Therefore, in the music reproduction robot apparatus 1, when the ellipsoidal housing member 2 traveling straightforwardly is to be stopped, such a situation that the housing central member 3 is urged to rotate in the straightforward direction by the straightforward direction inertial force generated by such straightforward travel can be suppressed, and also such a situation that, when the ellipsoidal housing member 2 is revolved successively toward one and the other direction, the entire ellipsoidal housing member 2 unsteadily moves forwardly and backwardly and/or leftwardly and rightwardly together with the housing central member 3 can be suppressed. Furthermore, in the music reproduction robot apparatus 1, since the ellipsoidal housing member 2 is formed in a leftwardly and rightwardly symmetrical shape, when the ellipsoidal housing member 2 is revolved successively toward one and the other direction upon stopping of traveling of the ellipsoidal housing member 2, the ellipsoidal housing member 2 is prevented from being tilted leftwardly or rightwardly.

Further, in the music reproduction robot apparatus 1, the ellipsoidal housing member 2 has a leftwardly and rightwardly symmetrical shape and the center of gravity of the housing central member 3 is positioned immediately below the central point P1 due to the weight 14, and besides the contacting area of the right side wheel 12 and the left side wheel 13 with the floor is minimized. Therefore, when the ellipsoidal housing member 2 is revolved successively to one and the other direction in order to stop traveling of the ellipsoidal housing member 2 which is traveling straightforwardly, the ellipsoidal housing member 2 can stop its traveling in a state wherein it almost maintains the reference posture without moving unsteadily. As a result, also when the music reproduction robot apparatus 1 successively changes the traveling state from straightforward traveling to revolutionary traveling or turning traveling, the ellipsoidal housing member 2 which has been traveled straightforwardly can be stopped almost without moving unsteadily to enter such revolutionary traveling or turning traveling. Therefore, also the revolutionary traveling or turning traveling succeeding the straightforward traveling can be executed without any unsteady movement.

It is to be noted that, while, in the embodiment described above, when the ellipsoidal housing member 2 traveling straightforwardly is to be stopped, the ellipsoidal housing member 2 is revolved toward one direction and then turned toward the other direction such that the housing front surface or the housing rear surface is directed toward the straightforward direction, the present invention is not limited to this. In particular, the ellipsoidal housing member 2 traveling straightforwardly may be stopped such that the ellipsoidal housing member 2 is revolved toward one direction in response to the speed of the straightforward traveling of the ellipsoidal housing member 2 and then revolved toward the other direction such that the housing front surface or the housing rear surface is directed toward the one direction on this side with respect to the straightforward direction or is directed toward the other direction on the interior side with respect to the straightforward direction. Also with this sequence of operations for stopping, advantages similar to those of the embodiment described hereinabove can be achieved.

Further, while, in the embodiment described above, when the ellipsoidal housing member 2 traveling straightforwardly is to be stopped, the ellipsoidal housing member 2 is revolved toward one direction and then turned toward the other direction such that the housing front surface or the housing rear surface is directed toward the straightforward direction, the present invention is not limited to this. In particular, the sequence of movements of revolving the ellipsoidal housing member 2 toward one direction and then revolving the ellipsoidal housing member 2 toward the other direction may be performed repetitively, for example, in response to a situation of the speed of straightforward traveling of the ellipsoidal housing member 2.

Figure 15:
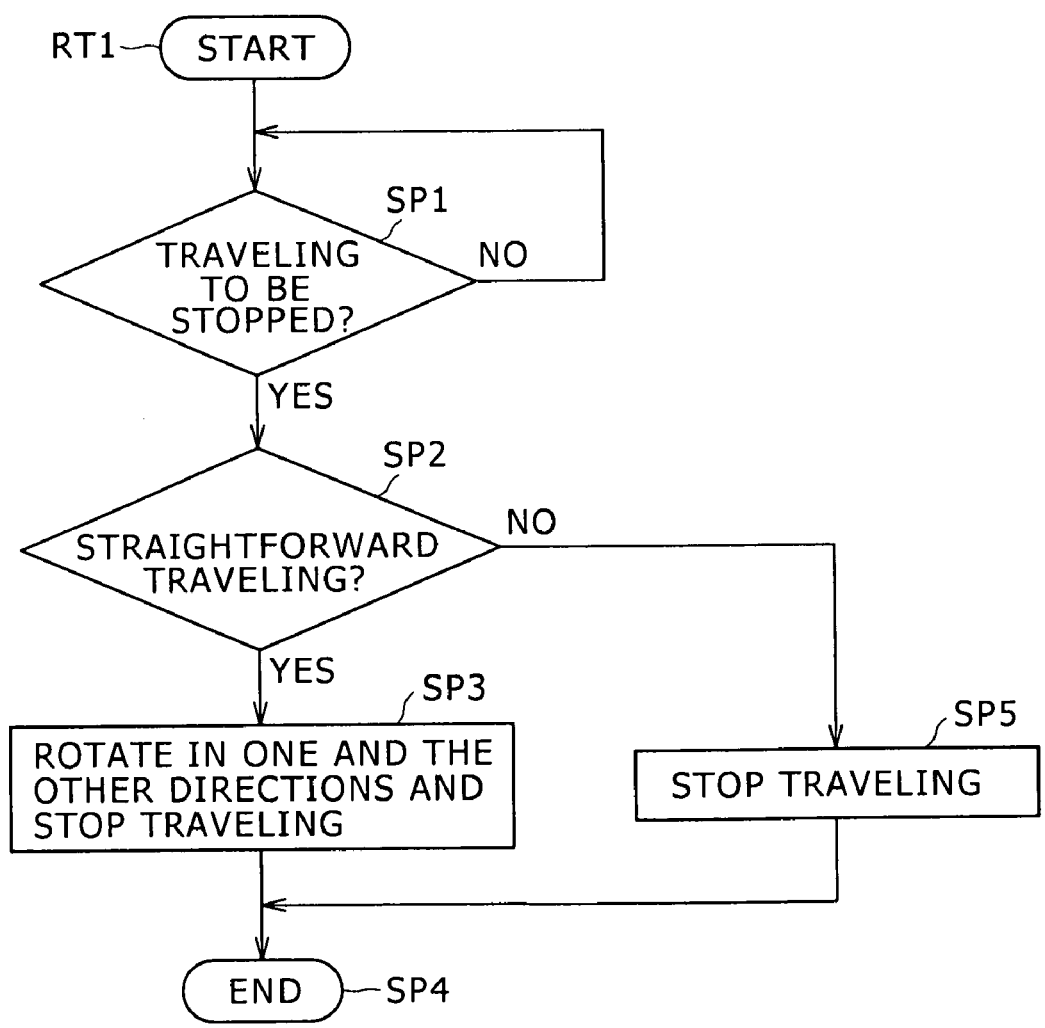
FIG. 15 is a flow chart illustrating a traveling stopping processing procedure to which another embodiment of the present invention is applied.

Further, in the embodiment described hereinabove, the control section 30 controls the wheel driving section 34 based on the right side wheel driving instruction value RD and the left side wheel driving instruction value LD included in the driving section control information INF2 produced based on music data to drive the right side wheel 12 and the left side wheel 13 to rotate thereby to stop traveling of the ellipsoidal housing member 2 from straightforward traveling. However, the present invention is not limited to this, and the following configuration may be employed. In particular, a traveling stopping instruction is included in the driving section control information INF2 in advance along the reproduction time axis AX1 of music data. Further, for example, the right side wheel driving instruction value RD and the left side wheel driving instruction value LD within the traveling stopping operation period RSA are stored in advance in the internal memory of the control section 30. Then, when the control section 30 detects the traveling stopping instruction included in the driving section control information INF2, it controls the wheel driving section 34 to drive the right side wheel 12 and the left side wheel 13 to rotate in accordance with the right side wheel driving instruction value RD and the left side wheel driving instruction value LD in the memory to stop the traveling of the ellipsoidal housing member 2 from the straightforward traveling.

Where the control section 30 has the configuration just described, when it starts, for example, a reproduction tune operation process, it starts a traveling stopping processing procedure RT1 illustrated in FIG. 15 in accordance with the travel stopping program stored in the memory. Referring to FIG. 15, after the traveling stopping processing procedure RT1 is started, the control section 30 decides at step SP1 whether or not traveling of the ellipsoidal housing member 2 is to be stopped. If the control section 30 detects the travel stopping instruction included in the driving section control information INF2, then it advances its processing to step SP2. At step SP2, the control section 30 decides whether or not the traveling state to be stopped is straightforward traveling. In this instance, the control section 30 analyzes, for example, the right side wheel driving instruction value RD and the left side wheel driving instruction value LD included in the driving section control information INF2 to decide the traveling state of the ellipsoidal housing member 2.

If an affirmative result is obtained at step SP2 because the traveling state of the ellipsoidal housing member 2 is straightforward traveling, then the control section 30 advances the processing to step SP3. At step SP3, the control section 30 controls the wheel driving section 34 to drive the right side wheel 12 and the left side wheel 13 to rotate in different conditions in accordance with the right side wheel driving instruction value RD and the left side wheel driving instruction value LD stored in the memory so that the ellipsoidal housing member 2 is stopped from the straightforward traveling. Thereafter, the processing advances to step SP4, at which the traveling stopping processing procedure RT1 is ended.

On the other hand, if a negative result is obtained at step SP2 because the traveling state of the ellipsoidal housing member 2 is revolutionary traveling or turning traveling, then the control section 30 advances the processing step SP5. At step SP5, the control section 30 controls the wheel driving section 34 to drive the right side wheel 12 and the left side wheel 13 to rotate, for example, in accordance with a predetermined right side wheel driving instruction value RD and a predetermined left side wheel driving instruction value LD for stopping revolutionary traveling or turning traveling stored in the memory in advance so that the ellipsoidal housing member 2 is stopped from the revolutionary traveling or turning traveling. Thereafter, the processing advances to step SP4, at which the traveling stopping processing procedure RT1 is ended. Also by the configuration described above, the music reproduction robot apparatus 1 can achieve advantages similar to those of the embodiment described hereinabove.

It is to be noted that, where the configuration described above is employed, the control section 30 may store a plurality of different right side wheel driving instruction values RD and left side wheel driving instruction values LD corresponding to different traveling speeds for straightforward traveling in the internal memory in advance and selectively use the right side wheel driving instruction values RD and the left side wheel driving instruction values LD in response to a traveling speed of the ellipsoidal housing member 2 which is traveling straightforwardly. Or, the control section 30 may store only a right side wheel driving instruction value RD and a left side wheel driving instruction value LD for stopping straightforward traveling in the internal memory while a right side wheel driving instruction value RD and a left side wheel driving instruction value LD for stopping revolutionary traveling or turning traveling is included in the driving section control information INF2.

Further, in the embodiment described hereinabove, the control section 30 controls the wheel driving section 34 to drive the right side wheel 12 and the left side wheel 13 to rotate in the same conditions to cause the ellipsoidal housing member 2 to travel straightforwardly and then revolve the ellipsoidal housing member 2 toward one direction and thereafter revolve the ellipsoidal housing member 2 toward the other direction to stop traveling of the ellipsoidal housing member 2. However, the present invention is not limited to this, and the control section 30 may control the wheel driving section 34 in a different manner. In particular, for example, the control section 30 may control the wheel driving section 34 to drive the right side wheel 12 and the left side wheel 13 to rotate so that, while the ellipsoidal housing member 2 travels in the straightforward direction, the ellipsoidal housing member 2 is revolved toward one direction and then revolved toward the other direction to stop the traveling thereof. More particularly, the control section 30 may control the wheel driving section 34 to drive the right side wheel 12 and the left side wheel 13 to rotate at different speeds in the same direction so that the ellipsoidal housing member 2 travels in a little meandering fashion or in a manner in which it draws an arc a little. Then, if the ellipsoidal housing member 2 is caused to travel in the straightforward direction but not straightforwardly in a strict sense, then by suitably selecting the direction and the angle in and over which the ellipsoidal housing member 2 is to be revolved once and the direction and the angle in and over which the ellipsoidal housing member 2 is to be revolved subsequently in response to the directions and the speeds of rotation of the right side wheel 12 and the left side wheel 13 when the traveling of the ellipsoidal housing member 2 is to be stopped, the inertial force generated in the ellipsoidal housing member 2 and acting to cause the ellipsoidal housing member 2 to travel in the straightforward direction can be almost canceled thereby to prevent the ellipsoidal housing member 2 to roll in the straightforward direction side and stop the traveling of the ellipsoidal housing member 2 precisely.

It is to be noted that, although the control section 30 preferably controls so that, when it controls rotational driving in order to stop the ellipsoidal housing member 2, the two wheels are rotated in the opposite directions with a substantially equal driving force, the present invention is not limited to this. In particular, the control section 30 may control so that the ellipsoidal housing member 2 is rotated by controlling the two wheels in relatively different conditions.

Further, while, in the embodiment described hereinabove, the two-wheel traveling apparatus is applied to the music reproduction robot apparatus 1 described hereinabove with reference to FIGS. 1A to 15, the present invention is not limited to this. In particular, the present invention can be applied to various two-wheel traveling apparatus such as a robot apparatus which does not have a music reproduction function or a radio controlled car which can be controlled remotely only if the apparatus can travel with two wheels supported for rotation on the same axis of rotation.

Furthermore, while, in the embodiment described above, the ellipsoidal housing member 2 described hereinabove with reference to FIGS. 1A to 15 is applied as a predetermined housing, the present invention is not limited to this. In particular, housings of various shapes such as a parallelepiped shape, a cubic shape, a spherical shape or a polyhedral shape can be applied widely.

Further, while, in the embodiment described above, the right side wheel 12 and the left side wheel 13 having such an annular shape as described hereinabove with reference to FIGS. 1a to 15 are applied as first and second wheels supported in parallel to each other for rotation in one and the other directions around a common axis on a housing, the present invention is not limited to this, and first and second wheels each in the form of a disk may be applied.

The present invention can be applied to a two-wheel traveling apparatus such as a robot apparatus and a radio controlled car which can travel with two wheels.

While preferred embodiments of the present invention has been described using specific terms, such description is for illustrative purposes only, and it is to be understood that changes and variations may be made without departing from the spirit or scope of the following claims.

What is claimed is:

1. A music reproduction robot apparatus, comprising:
   a housing;
   means coupled to said housing receiving music data and control information corresponding to the music data;
   a number of speakers coupled to said housing and arranged to have music based on the received music data outputted therefrom during operation;
   first and second wheels supported for individual rotation in one and the other direction around a common axis on said housing;
   a wheel driving section configured to drive said first and second wheels to rotate individually; and
   a control section configured to control said wheel driving section;
   said control section being operable to control said wheel driving section to drive said first and second wheels based on the control information corresponding to the music data so as to cause said housing to travel in synchronism with the music outputted from the number of speakers, and
   said control section being operable to control, when traveling of said housing which is traveling is to be stopped, said wheel driving section to drive said first and second wheels to rotate in different conditions from each other so that said housing is revolved toward a first one of the leftward and rightward directions with respect to a traveling direction of said housing once and then revolved toward a second one of the leftward and rightward directions to stop said housing.

2. The traveling apparatus according to claim 1, wherein, when the traveling of said housing which is traveling straightforwardly in the traveling direction is to be stopped, said control section controls said wheel driving section to drive said first and second wheels to rotate in different conditions from each other so that said housing is revolved toward the first direction such that a front face of said housing which is directed in the straightforwardly traveling direction is directed now to the right side or the left side with respect to the straightforwardly traveling direction and then said housing is revolved toward the second direction such that the front face of said housing is directed to the straightforwardly traveling direction.

3. The traveling apparatus according to claim 1, wherein said first and second wheels are made of a resilient material.

4. The traveling apparatus according to claim 1, wherein each of said first and second wheels is formed such that a central portion of a surface projects outwardly over an overall circumference.

5. The traveling apparatus according to claim 1, wherein said housing has a center of gravity displaced from the common axis of said first and second wheels.

6. The traveling apparatus according to claim 1, wherein said housing has a leftwardly and rightwardly symmetrical shape as viewed in the traveling direction when said housing travels in the traveling direction, and said first and second wheels are supported for rotation at positions on said housing spaced by an equal distance from the central point of said housing.

7. The traveling apparatus according to claim 1, wherein only said first and second wheels contact with the ground.

8. A method for controlling a music reproduction robot apparatus, said apparatus including a housing, first and second wheels supported for rotation in one and the other direction around a common axis on said housing, and a number of speakers coupled to said housing and arranged to have music outputted therefrom, said method comprising:
   receiving music data and control information corresponding to the music data;
   controlling driving of said first and second wheels based on the control information corresponding to the music data so as to cause said housing to travel in synchronism with the music outputted from the number of speakers; and
   controlling, when traveling of said housing which is traveling is to be stopped, driving of said first and second wheels in different conditions from each other so that said housing is revolved toward a first one of the leftward and rightward directions with respect to a traveling direction of said housing once and then revolved toward a second one of the leftward and rightward directions to stop said housing.

9. The method according to claim 8, wherein, when the traveling of said housing which is traveling straightforwardly in the traveling direction is to be stopped, said first and second wheels are driven to rotate in different conditions from each other so that said housing is revolved toward the first direction such that a front face of said housing which is directed in the straightforwardly traveling direction is directed now to the right side or the left side with respect to the straightforwardly traveling direction and then said housing is revolved toward the second direction such that the front face of said housing is directed to the straightforwardly traveling direction.

10. The method according to claim 8, wherein said first and second wheels are made of a resilient material.

11. The method according to claim 8, wherein each of said first and second wheels is formed such that a central portion of a surface thereof projects outwardly over an overall circumference thereof.

12. The method according to claim 8, wherein said housing has a center of gravity displaced from the common axis of said first and second wheels.

13. The method according to claim 8, wherein said housing has a leftwardly and rightwardly symmetrical shape as viewed in the traveling direction when said housing travels in the traveling direction, and said first and second wheels are supported for rotation at positions on said housing spaced by an equal distance from the central point of said housing.

14. The method according to claim 8, wherein only said first and second wheels contact with the ground.

* * * * *